United States Patent [19]
Saeki et al.

[11] Patent Number: 6,028,755
[45] Date of Patent: Feb. 22, 2000

[54] DC-TO-DC CONVERTER CAPABLE OF PREVENTING OVERVOLTAGES

[75] Inventors: Mitsuo Saeki; Hidetoshi Yano; Hidekiyo Ozawa, all of Kawasaki, Japan

[73] Assignee: Fujitsu Limited, Kawasaki, Japan

[21] Appl. No.: 09/235,729

[22] Filed: Jan. 22, 1999

Related U.S. Application Data

[62] Division of application No. 08/694,581, Aug. 9, 1996.

[30] Foreign Application Priority Data

Aug. 11, 1995 [JP] Japan .................................. 7-205938
Aug. 11, 1995 [JP] Japan .................................. 7-205939

[51] Int. Cl.[7] ...................................... H02H 3/20
[52] U.S. Cl. ........................ 361/91.1; 361/91.6; 361/18; 361/86; 323/285
[58] Field of Search ................................ 361/18, 79, 86, 361/91, 93, 100–101, 104, 54, 56, 57; 323/224, 284, 285, 299

[56] References Cited

U.S. PATENT DOCUMENTS

| | | | |
|---|---|---|---|
| 3,819,986 | 6/1974 | Fukuoka | 361/56 |
| 4,648,015 | 3/1987 | Davis et al. | 363/15 |
| 4,672,303 | 6/1987 | Newton | 323/285 |
| 5,029,269 | 7/1991 | Elliott et al. | 363/21 |
| 5,097,196 | 3/1992 | Schoneman | 323/222 |
| 5,134,355 | 7/1992 | Hastings | 323/211 |
| 5,155,648 | 10/1992 | Gauthier | 361/58 |
| 5,233,287 | 8/1993 | Lenk | 323/268 |
| 5,319,515 | 6/1994 | Pryor et al. | 361/93 |
| 5,347,211 | 9/1994 | Jakubowski | 323/351 |
| 5,367,247 | 11/1994 | Blocher et al. | 323/222 |
| 5,506,493 | 4/1996 | Stengel | 323/223 |
| 5,528,132 | 6/1996 | Doluca | 323/284 |
| 5,596,465 | 1/1997 | Honda et al. | 361/18 |

FOREIGN PATENT DOCUMENTS

| | | |
|---|---|---|
| 50-152264 | 12/1975 | Japan . |
| 55-122477 | 9/1980 | Japan . |
| 56-53526 | 5/1981 | Japan . |
| 57-51030 | 3/1982 | Japan . |
| 59-132715 | 7/1984 | Japan . |
| 60-152225 | 8/1985 | Japan . |
| 62-203557 | 9/1987 | Japan . |
| 62-296719 | 12/1987 | Japan . |
| 63-48123 | 2/1988 | Japan . |
| 63-302719 | 12/1988 | Japan . |
| 2-155418 | 6/1990 | Japan . |
| 4-87555 | 3/1992 | Japan . |
| 4-105559 | 4/1992 | Japan . |
| 9-284994 | 10/1997 | Japan . |

Primary Examiner—Michael J. Sherry
Attorney, Agent, or Firm—Staas & Halsey LLP

[57] ABSTRACT

To avoid burning out a capacitor in a synchronous rectification type DC-to-DC converter due to overvoltages, the synchronous rectification type DC-to-DC converter includes a storage unit storing therein power derived from a power supply, switching elements connecting and disconnecting respective signal paths from power and ground, and a control unit controlling the connecting/disconnecting operations of the switching elements to maintain a voltage output from the storage unit at a predetermined value. The DC/DC converter also includes an overvoltage detecting unit monitoring a voltage derived from the power supply to thereby output an alarm signal when the voltage derived from the power supply exceeds a preselected voltage value, a short-circuiting unit influencing the connecting conditions of the switching elements when the alarm signal from the overvoltage detecting unit is input therein, whereby the voltage derived from the power supply is shortcircuited, and an interrupting unit interrupting one of the signal paths by the power shortcircuited by the shortcircuiting unit.

46 Claims, 12 Drawing Sheets

DC-TO-DC CONVERTER CAPABLE OF PREVENTING OVERVOLTAGES

This application is a Divisional of application Ser. No. 08/694,581, filed Aug. 9, 1996, now pending.

BACKGROUND OF THE INVENTION

1). Field of the Invention

The present invention generally relates to a DC-to-DC converter. More specifically, the present invention is directed to a voltage drop type DC-to-DC converter capable of preventing overvoltages appearing in an input voltage and an output voltage.

2). Description of the Prior Art

Portable type electronic appliances such as notebook type personal computers install cells as power supplies thereof. To operate these portable type electronic appliances under stable conditions, these cells are preferably capable of supplying constant voltages.

To the contrary, general-purpose cells inherently owns such a characteristic that output voltages are gradually lowered during discharge operation. Therefore, portable type electronic appliances are equipped with DC-to-DC converters capable of maintaining the output voltages of these cells at constant values.

The operation time during which an electronic appliance can be effectively operated by a cell is one of the major important factors to evaluate the performance of this portable type electronic appliance. To maintain such an effective operation time as long as possible, power consumption by this portable type electronic appliance should be, of course, reduced, and furthermore, the converting efficiency of the DC/DC converter should be increased. This is because the converting efficiency of this DC/DC converter is directly reflected onto the power consuming ratio of the cell.

As one method for increasing the converting efficiency of the DC/DC converter, the synchronous rectification type DC/DC converter may be utilized. When this synchronous rectification type DC/DC converter is utilized, the resultant converting efficiency may be increased by approximately 10%, as compared with the conventional type DC/DC converters Also, the converting efficiency of the DC/DC converter may be influenced by the performance of a capacitor employed in this DC/DC converter. For instance, in the current DC/DC converters, signals are oscillated in high frequencies in order to increase the converting efficiency and also to make the entire appliance compact. In such a high-frequency type DC/DC converter, a smoothing capacitor is required in an output unit thereof so as to reduce phase errors.

A smoothing capacitor includes an equivalent series resistor (ESR). When the resistance value of this equivalent series resistor (ESR) is large, the converting efficiency of the DC/DC converter would be deteriorated.

Therefore, such a capacitor is required, in which an equivalent series resistor (ESR) having a small resistance value is included, in order to increase the converting efficiency of the DC/DC converter.

As the capacitor in which the equivalent series resistor having the small resistance value is included, there is an organic capacitor.

When an organic capacitor is employed as a smoothing capacitor, since the converting efficiency of the DC/DC converter is increased, heat dissipation is reduced even when a large current flows. As a result, the DC/DC converter with employment of the organic capacitor may be utilized as such a DC/DC converter capable of allowing large currents, for instance, 3 to 5 amp.

In the case that the DC/DC converter with using the organic capacitor as the smoothing capacitor is employed in the apparatus capable of allowing large currents, it is preferable to use an organic capacitor capable of allowing high ripple components as the capacitor employed in the input unit of the DC/DC converter.

On the other hand, as explained above, although organic capacitors own great merits such as high frequency characteristics and temperature characteristics, these organic capacitors have such demerits that the organic capacitors are easily destroyed by receiving overvoltages, resulting in fire and smoke explosion.

Accordingly, when an organic capacitor is employed in a DC/DC converter, an overvoltage protection mechanism is necessarily required for this organic capacitor.

As the factors why overvoltages are produced in DC/DC converters, various cases may be conceived. That is, the output voltage is increased due to circuit failure of this DC/DC converter. Also, since the cells and the recharging devices malfunction, or improper cells/recharging devices are employed, the voltage inputted into the DC/DC converter is increased to produce the overvoltage.

First, when the output voltage of the DC/DC converter becomes the overvoltage, the smoothing capacitor employed in the output unit of this DC/DC converter must be protected.

As the method for protecting the smoothing capacitor, a zener diode is employed in the output unit of the DC/DC converter. In this method, when the voltage outputted from the DC/DC converter exceeds the normal voltage of this zener diode, the zener diode would be burned out, so that a shortcircuit is established between this DC/DC converter and the load.

In this shortcircuit case, since the current flow is stopped due to this shortcircuit established between the DC/DC converter and the load, it is possible to prevent the overvoltage from being applied to the organic capacitor.

On the other hand, when the zener diode is used to protect the capacitor, if the zener diode fails in the shortcircuit mode, then this shortcircuited zener diode can having the protection function. To the contrary, when this zener diode fails in the opencircuit mode, the organic capacitor provided in the output unit of the DC/DC converter would be burned out, resulting in fire and smoke explosion.

Furthermore, it is practically impossible to define whether the zener diode fails in the opencircuit mode, or the shortcircuit mode. As a consequence, it is improper to utilize such a zener diode as the protection circuit of the DC/DC converter.

On the other hand, in order to prevent the organic capacitor from being burned out by receiving the overvoltage, it is conceivable to employ such a method for using a high withstanding voltage type organic capacitor. However, since such a high withstanding voltage type organic capacitor owns a small capacitance, a plurality of organic capacitors are necessarily employed so as to obtain a desired capacitance. Accordingly, the overall circuit would be made bulky. In addition, there is another problem that since the high withstanding voltage organic capacitor owns the high equivalent series resistor (ESR), the converting efficiency of the DC/DC converter would be lowered.

Also, to prevent the organic capacitor from being burned out by receiving the overvoltage, there is another method for providing a burning preventing fuse with each of all organic capacitors used in the DC/DC converter. However, this method has other demerits that a total number of constructive elements of this DC/DC converter is increased, and at the same time, the manufacturing cost of this DC/DC converter is increased. Moreover, when the fuses are provided with these organic capacitors respectively, there is another problem that the converting efficiency of the DC/DC converter is lowered due to the fuse resistance values.

In addition, since other organic capacitors are also employed in the input unit of the DC/DC converter, this organic capacitor must be protected from the overvoltages.

SUMMARY OF THE INVENTION

The present invention has an object to provide a compact synchronous rectification mode voltage drop type DC/DC converter with a high converting efficiency. Concretely speaking, this DC/DC converter can be constructed of a simple circuit arrangement, and can be protected from an overvoltage appearing in an input voltage thereto. Also, this DC/DC converter can be protected from fire and smoke explosion of a capacitor caused by receiving overvoltages.

A DC/DC converter, according to the present invention, is such a synchronous rectification type DC-to-DC converter including: storage means for storing therein power derived from a power supply; a first switch element provided on a first signal path used to connect said power supply with said storage means, for connecting/disconnecting said first signal path; a second switch element provided on a second signal path used to connect said first switch element with said storage means, for connecting/disconnecting said second signal path to/from the ground; and control means for controlling the connecting/disconnecting operations of said first switch element and said second switch so as to maintain a voltage outputted from said storage means at a predetermined value.

A first IC/DC converter of the present invention is an apparatus capable of protecting a circuit (for instance, an organic capacitor) of the DC/DC converter when an input voltage becomes an overvoltage.

This first DC/DC converter is comprised of an overvoltage detecting means, a shortcircuiting means, and an interrupting means.

The overvoltage detecting means monitors a voltage derived from said power supply to thereby output an alarm signal when said voltage derived from said power supply exceeds a preselected voltage value. This alarm signal is inputted to the shortcircuiting means.

The shortcircuiting means brings said first switch element and said second switch element to connecting conditions when the alarm signal from the overvoltage detecting means is inputted thereinto, whereby the voltage derived from said power supply is shortcircuited.

At this time, since a large current flows through the DC/DC converter due to this shortcircuit, the interrupting means interrupts the first signal path when this large current is received.

As a result, the power supplied to the DC/DC converter is interrupted, so that it is possible to prevent the overvoltage from being applied to the circuit (for example, an organic capacitor) provided in the input unit of the DC/DC converter.

The above-described overvoltage means may include a reference voltage producing means for producing a reference voltage; and a comparing unit for comparing said reference voltage produced from said reference voltage producing unit with the voltage derived from said power supply to thereby output the alarm signal when said voltage derived from said power supply is higher than said reference voltage.

A second DC/DC converter according to the present invention is such an apparatus capable of protecting a circuit provided in the output unit of this DC/DC converter, and a load of this DC/DC converter when the output voltage of the DC/DC converter becomes the overvoltage.

The second DC/DC converter is comprised of an overvoltage detecting means, and a clamping means.

The overvoltage detecting means monitors the voltage outputted from the DC/DC converter to thereby output an alarm signal when said output voltage exceeds a predetermined voltage value, and the alarm signal is inputted to the clamping means.

The clamping means brings said first switch element to a disconnecting state and, at the same time, brings said second switch element to a connecting state, whereby the output voltage from said storage means is clamped to the ground level.

As a result, it is possible to prevent the overvoltage from being applied to the circuit provided in the output unit of the DC/DC converter, and also the load for this DC/DC converter.

The overvoltage means may include a reference voltage producing means for producing a reference voltage; and a voltage comparator for comparing said reference voltage produced from said reference voltage producing unit with the voltage derived from said storage means to thereby output the alarm signal when said voltage derived from said storage means is higher than said reference voltage.

It should be noted that when the first switch element of the DC/DC converter malfunctions in the shortcircuit mode, the output voltage of the DC/DC converter is brought into the overvoltage conditions In such a case, it is also required to protect the load of the DC/DC converter, and also the circuit within this DC/DC converter.

Therefore, a third DC/DC converter of the present invention employs such an arrangement for protecting the circuit within this DC/DC converter and the load for this DC/DC converter when the first switch element fails in the shortcircuit mode.

That is, the third DC/DC converter is comprised of shortcircuiting means for bringing said second switch element to a connecting state when said first switch element fails under a shortcircuited state, whereby the voltage derived from said power supply is shortcircuited; and interrupting means for interrupting said first signal path by power shortcircuited by said shortcircuiting means.

This interrupting means is a fuse to be melted down by the large current produced by the shortcircuit.

As described above, according to the DC/DC converter of the present invention, when the input/output voltages of this DC/DC converter are under overvoltage conditions, the first and second switch elements are used as the overvoltage protection circuit. As a consequence, it is possible to prevent the overvoltages from being applied to the constructive elements of this DC/DC converter and the load for this DC/DC converter without making the circuit arrangement complex.

As a result, it is possible to prevent the organic capacitors use in the DC/Dc converter from the fire and small exposition problems. Moreover, the DC/DC converter can be made compact with the improved converting efficiency.

DETAILED DESCRIPTION OF THE PREFERRED EMBODIMENT

Referring now to drawings, various DC/DC converters according to the present invention will be described.

Figure 12:
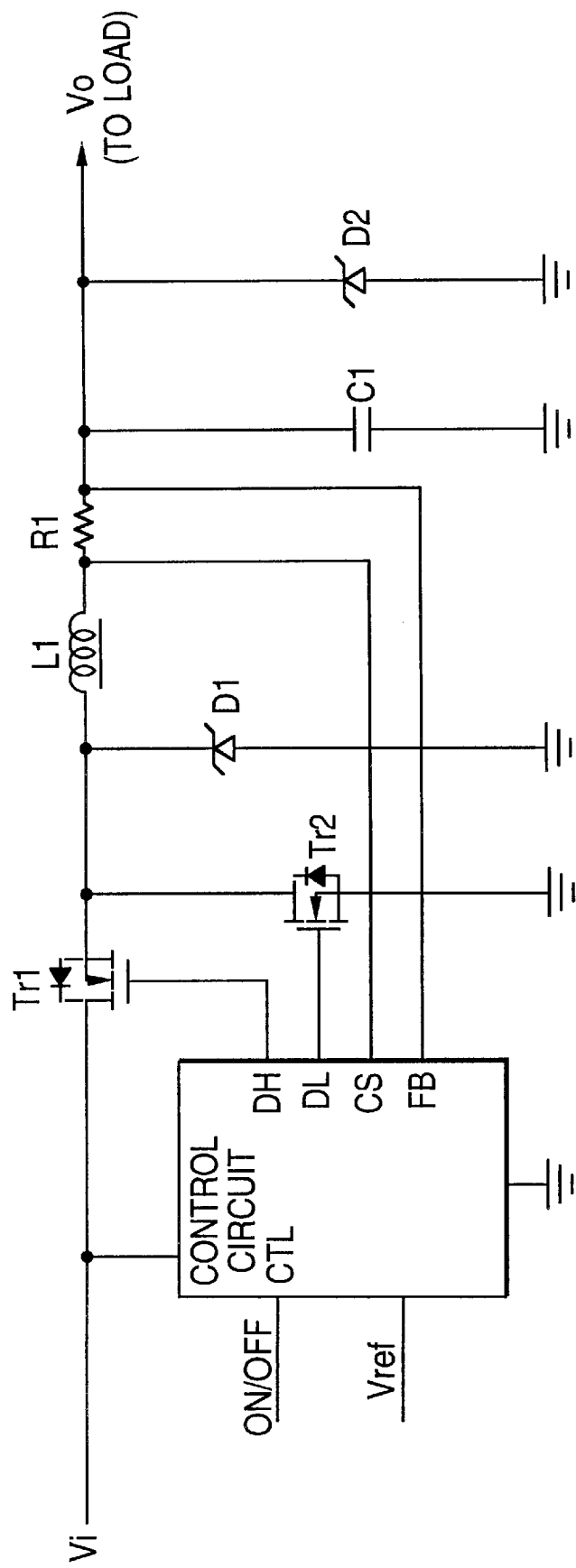
FIG. 12 schematically shows the arrangement of the conventional DC/DC converter.

First, for a better understanding of the present invention, a conventional DC-to-DC converter (DC/DC converter) will now be explained with reference to FIG. 12.

It is assumed that this conventional DC/DC converter is provided between a cell (not shown in FIG. 12) and a load (not shown either).

The DC/DC converter is comprised of a main switching transistor Tr1, a transistor Tr2 for synchronous rectification, a diode D1, a resistor R1, a capacitor C1, a choke coil L1, and a control circuit CTL. Furthermore, a zener diode D2 is provided at an output portion of this DC/DC converter.

The main switching transistor Tr1 is a field-effect transistor (FET) which is turned ON/OFF in response to a signal DH from the control circuit CTL.

The choke coil L1 corresponds to a coil for converting a voltage.

The diode D1 is such a flywheel diode for discharging energy to the output side, which has been stored in the choke coil L1 while the main switching transistor Tr1 is brought into the OFF state.

The transistor Tr2 for synchronous rectification is a flywheel switch circuit for discharging energy to the output side, which has been stored in the choke coil L1 while the main switching transistor Tr1 is turned OFF. This synchronous rectification transistor Tr2 is a field-effect transistor (FET) which is turned ON/OFF in response to a signal DL from the control circuit CTL.

For example, the synchronous rectification transistor Tr2 is brought into the ON state when the voltage is applied to the diode D1 in the forward direction, and brought into the OFF state when this voltage is applied to the diode D2 in the reverse direction.

The resistor R1 is such a sense resistor R1 used to measure a value of a current flowing from tha DC/DC converter to the load.

The capacitor C1 is a smoothing capacitor for eliminating an AC component of the signal outputted from the sense resistor R1.

The zener diode D2 corresponds to a protection circuit for monitoring as to whether or not a voltage from which the AC component has been removed by the capacitor C1 is lower than, or equal to the normal voltage, namely, whether or not a voltage from which the AC component has been removed by the capacitor C1 is an overvoltage.

When the voltage from which the AC component is removed by the capacitor C1 exceeds the standard voltage, this zener diode D2 becomes the ON state to thereby clamp the output voltage from the DC/DC converter to the standard voltage. When the overvoltage (excess voltage) is further increased, the zener diode D2 is burned out to be shortcircuited between the DC/DC converter and the load.

A voltage from the cell, a voltage CS inputted to the sense resistor R1, and a voltage FB outputted from the sense resistor R1 are entered into the control circuit CTL. Furthermore, either an ON instruction value or an OFF instruction value, which are externally supplied, and a target voltage $V_{ref}$ are entered into this control circuit CTL.

This control circuit CTL monitors the voltage CS inputted into the sense resistor R1, and the voltage FB outputted from the sense resistor R1 so as to measure a voltage drop appearing in the sense resistor R1.

Also, the control circuit CTL Compares the output voltage FB from the resistor R1 with the externally supplied target voltage $V_{ref}$ to thereby turn ON/OFF the main switching transistor T1 and the synchronous rectification transistor Tr2 in such a maoor that the output voltage value of the DC/DC converter becomes a preselected voltage value.

In the case that the above-described DC/DC converter is operated under normal condition, since the output voltage of this DC/DC converter is sufficiently lower than the normal (voltage of the zener diode D2, the zener diode D2 is brought into the OFF state. In this case, the voltage from which the AC component is removed by the capacitor C1 is directly applied to the load.

On the other hand, when the output voltage from the DC/DC converter becomes the overvoltage, the output voltage value of the DC/DC converter becomes higher than the normal voltage value of the zener diode D2. When the output voltage becomes higher than the normal voltage, the zener diode D2 is brought into the ON state. In this case, the output voltage of the DC/DC converter it clamped to the normal voltage of the zener diode D2. Accordingly, it is possible to prevent the overvoltage from being applied to the load.

Since the above-described conventional DC/DC converter owns no such a mechanism capable of limiting the current flow in the zener diode D2, If the overvoltage is further continued, then the zener diode D2 would be burned out. In this case, a shortcircuit condition is made between this DC/DC converter and the load. As a result, no current may flow through the smoothing capacitor C1,. so that burning out of this smoothing capacitor C1 can be prevented.

However, when the zener diode is employed so as to protect the smoothing capacitor, if the zener diode fails in the shortcircuit mode, then this zener diode may function as the protection circuit, whereas if the zener diode fails in the opencircuit mode, then this zener diode could not have the protection function. In such a case that the zoner diode malfunctions in the opencircuit mode, the organic capacitor provided in the output unit of this conventional DC/DC converter would be burned out. Thus, there is such a problem that this burned organic capacitor may emit smoke, or will make a fire.

Furthermore, since it is practically impossible to specify whether the zener diode will fail in the opencircuit mode, or in the shortcircuit mode, the use of such a zoner diode as the protection circuit of the DC/DC converter would become improper.

Also, since another organic capacitor is employed in the input unit of this conventional DC/DC converter, these organic capacitors should be protected.

A description will now be made of a DC-to-DC converter according to an embodiment of the present invention, capable of solving the above-described problems.

EMBODIMENT MODE 1

Figure 1:
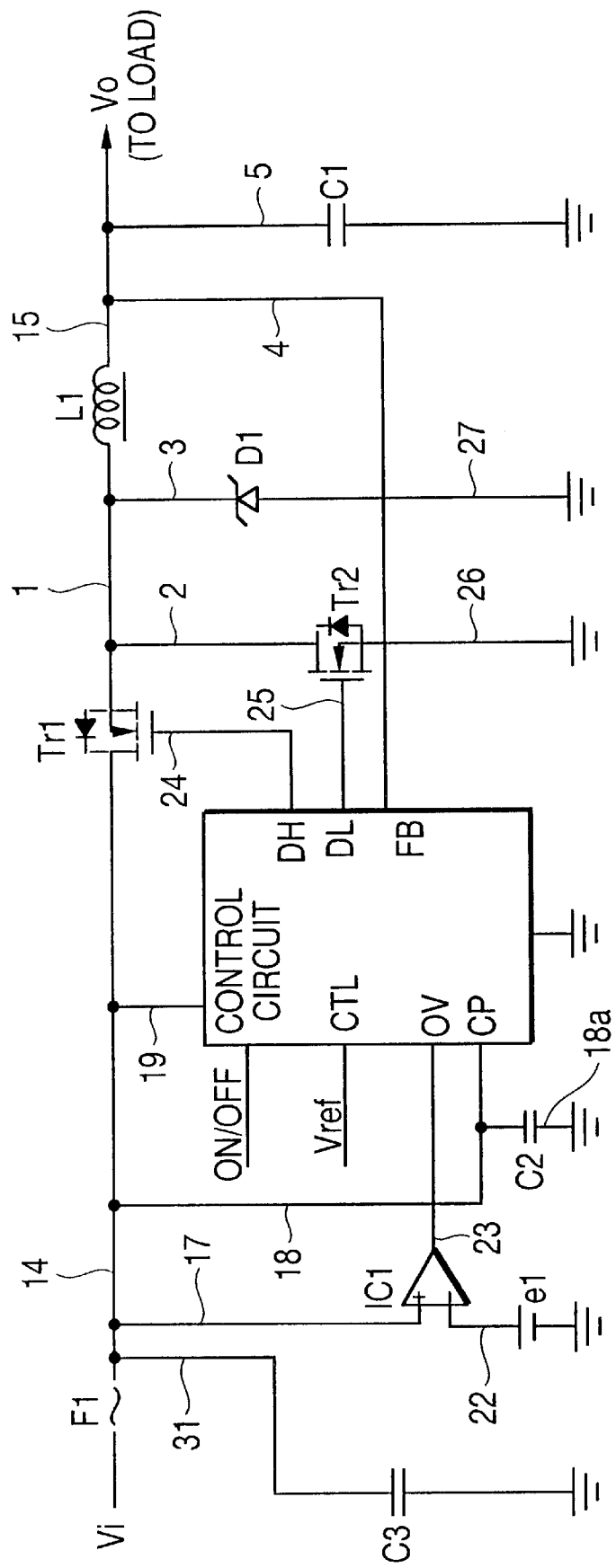
FIG. 1 schematically indicates an arrangement of a DC/DC converter according to an embodiment mode 1 of the present invention.

FIG. 1 is a schematic diagram for showing a DC-to-DC converter according to a first embodiment mode 1 of the present invention. It should be noted that the same reference numerals used in the prior art DC/DC converter will be employed as those for denoting the same or similar constructive elements in the following embodiment modes.

A DC/DC converter is provided between a cell functioning as a power supply and a load (not shown in FIG. 1), and is such an apparatus for converting a voltage applied from the cell into a constant voltage so as to supply this constant voltage to the load.

(ARRANGEMENT OF FIRST DC/DC CONVERTER)

The DC/DC converter according to this embodiment mode 1 is constructed of a fuse F1, a control circuit CTL, a main switching transistor Tr1, a synchronous rectification transistor Tr2, a diode D1, a choke coil L1, a capacitor C1, a voltage comparator IC1, a power supply e1 for producing a reference voltage e1, a capacitor C2, and a capacitor C3.

(CIRCUIT CONNECTIONS FOR FIRST DC/DC CONVERTER)

Now, connection modes of the above-described constructive elements will be described.

The fuse F1 is employed in a half way of a signal line 14 used to connect the cell with the main switching transistor Tr1.

The main switching transistor Tr1 connected via this signal line 14 to the cell is connected via another signal line 1 to the choke coil L1, and via another signal line 24 to the control circuit CTL.

The above-described main switching transistor Tr1 is, for instance, an MOS-FET (Metal Oxide Semiconductor Field-Effect Transistor) having a source terminal, a drain terminal, and a gate terminal, namely three terminals. In this case, the signal line 14 is connected to the drain terminal of the main switching transistor Tr1. Also, the signal line 1 is connected to the source terminal of the main switching transistor Tr1. Furthermore, the signal line 24 is connected to the gate terminal of the main switching transistor Tr1.

The choke coil L1 connected via the signal line 1 with the main switching transistor Tr1 is further connected via the signal line 15 is to the load (not shown in FIG. 1).

Four signal lines 31, 17, 18, 19 are connected to a half way of the signal line 14 for connecting the fuse F1 with the main switching transistor Tr1.

The signal line 31 located near the fuse F1 among the above-described four signal lines 31, 17, 18, 19 is connected via the capacitor C3 to the ground.

The signal line 17 among the above-described four signal lines 31, 17, 18, 19 is connected to the voltage comparator IC1. This voltage comparator IC1 owns, for example, a non-inverting input terminal, an inverting input terminal, and an output terminal. In this case, the signal line 17 is connected to the non-inverting input terminal of the voltage comparator IC1. The inverting input terminal of the voltage comparator IC1 is connected via another signal line 22 to the power supply e1. Furthermore, the output terminal of the voltage comparator IC1 is connected via a signal line 23 to the control circuit CTL.

The signal line 18 among the above-explained four signal lines 31, 17, 18, 19 is connected to the control circuit CTL. A signal line 18a is connected to a half way of this signal line 18. This signal line 18a is connected via the capacitor C2 to the ground.

The signal line 19 located near the main switching transistor Tr1 among the four signal lines 31, 17, 18, 19 is connected to the control circuit CTL.

Two signal lines 2 and 3 are connected to a half way of the signal line 1 used to connect the main switching transistor Tr1 with the choke coil L1.

The signal line 2 located near the main switching transistor Tr1 among the two signal lines 2 and 3 is connected to the synchronous rectification transistor Tr2. This synchronous rectification transistor Tr2 is connected via the signal line 25 to the control circuit CTL, and via a signal line 26 to the round.

The synchronous rectification transistor Tr2 is, for instance, an MOS-FET (Metal Oxide Semiconductor Field-Effect Transistor) having three terminals, namely a drain terminal, a source terminal, and a gate terminal. The signal line 2 is connected to the drain terminal of the synchronous rectification transistor Tr2. Also, the line 25 is connected to the gate terminal of the synchronous rectification transistor Tr2. Further, the signal line 26 is connected to the source terminal of the synchronous rectification transistor Tr2.

The signal line 3 located near the choke coil L1 among the two signal lines 2 and 3 is connected to the cathode terminal of the diode D1. The anode terminal of this diode D1 is connected via a signal line 27 to the ground.

Further, the signal lines 4 and 5 are connected to a half way of the signal line 15 for connecting the choke coil C1 to the load.

The signal line 4 positioned near the choke coil L1 among the two signal lines 4 and 5 is connected to the control circuit CTL. This signal line 4 is such a signal line for feeding back the output voltage FB of the DC/DC converter to the control circuit CTL.

The signal line 5 positioned near the load among the two signal lines 4 and 5 is connected via the capacitor C1 to the ground.

(CIRCUIT FUNCTIONS OF FIRST DC/DC CONVERTER)

Then, functions of the above-described respective constructive elements will now be explained.

(POWER SUPPLY e1)

The power supply e1 produces a reference voltage "e1" to be inputted to the DC/DC converter.

(VOLTAGE COMPARATOR IC1)

The voltage comparator IC1 compares the voltage Vi derived from the cell with the reference voltage e1 produced from the power supply e1 to thereby output a OV indicative of the comparison result. The OV outputted from the voltage comparator IC1 is inputted via the signal line 23 to the control circuit CTL.

For instance, the voltage comparator IC1 subtracts the reference voltage e1 from the voltage Vi, and outputs a signal having a low level when the subtraction result is smaller than, or equal to "0", otherwise outputs a signal having a high level when the subtraction result is a positive value.

(CAPACITOR C2)

The capacitor C2 stores therein power used to drive the main switching transistor Tr1 and the synchronous rectification transistor Tr2.

(CAPACITOR C3)

The capacitor C3 is organic capacitor which may be a smoothing capacitor for removing a pulsatory ripple conponent contained in the voltage inputted in the DC/DC convertor.

(MAIN SWITCHING TRANSISTOR Tr1)

The main switching transistor Tr1 inputs thereinto the control signal DH from the control circuit CTL and connects/disconnects a signal path between the signal line 14 and the signal line 1 in response to the input control signal DH.

For example, when the voltage from the control circuit CTL is applied to the gate terminal, the main switching transistor Tr1 is turned ON to thereby connect between the drain terminal and the source terminal and also between the signal line 14 and the signal line 1.

When the voltage from the control circuit CTL is not applied to the gate terminal, the main switching transistor Tr1 is turned OFF to thereby disconnect between the drain terminal and the source terminal and also between the signal line 14 and the signal line 1.

(CHOKE COIL L1)

The choke coil L1 is a voltage converting coil.

(DIODE D1)

The diode D1 is such a flywheel diode for discharging the energy stored in the choke coil L1 when the main switching transistor Tr1 is turned OFF toward the output circuit side.

(SYNCHRONOUS RECTIFICATION TRANSISTOR Tr2)

The synchronous rectification transistor Tr2 is a switch circuit which inputs thereinto the signal DL from the control circuit CTL, and connects/disconnects between the signal line 2 and the signal line 26 in response to the input signal DL.

For example, when the voltage from the control circuit CTL is applied to the gate terminal, the synchronous rectification transistor Tr2 is turned ON to thereby connect between the drain terminal and the source terminal and also between the signal line 2 and the signal line 26.

When the voltage from the control circuit CTL is not applied to the gate terminal, the synchronous rectification transistor Tr2 is turned OFF to thereby disconnect between the drain terminal and the source terminal and also connect between the signal line 2 and the signal line 26.

In this embodiment, the synchronous rectification transistor Tr2 is a flywheel switch circuit for causing the energy stored in the choke coil L1 while the main switching transistor Tr1 is turned OFF to be outputted.

For instance, the synchronous rectification transistor Tr2 is turned ON (namely, under condition to connect between signal line 2 and signal line 26) when the voltage is applied to the diode D1 in the forward direction, and is turned OFF (namely, under condition to disconnect between signal line 2 and signal line 26) when voltage is applied to the diode D1 in the reverse direction. At this time, the voltage drop of the diode D1 is reduced.

(CAPACITOR C1)

The capacitor C1 in a smoothing capacitor for removing a pulsatory ripple component contained in the voltage outputted from the choke coil L1.

(CONTROL CIRCUIT CTL)

The ON instruction value, or the OFF instruction value, and the target voltage $V_{ref}$ are externally entered into the control circuit CTL in addition to the above-described signal lines 4, 19, 23, 18, 24, 25. The externally applied target voltage $V_{ref}$ is a reference voltage to be outputted from the DC/DC converter.

Then, the control circuit CTL controls turning ON/OFF of the main switching transistor Tr1 and the synchronous rectification transistor Tr2 in response to the OV derived from the voltage comparator IC1, the output voltage FB inputted via the signal line 4, and the externally supplied target voltage $V_{ref}$.

Figure 2:
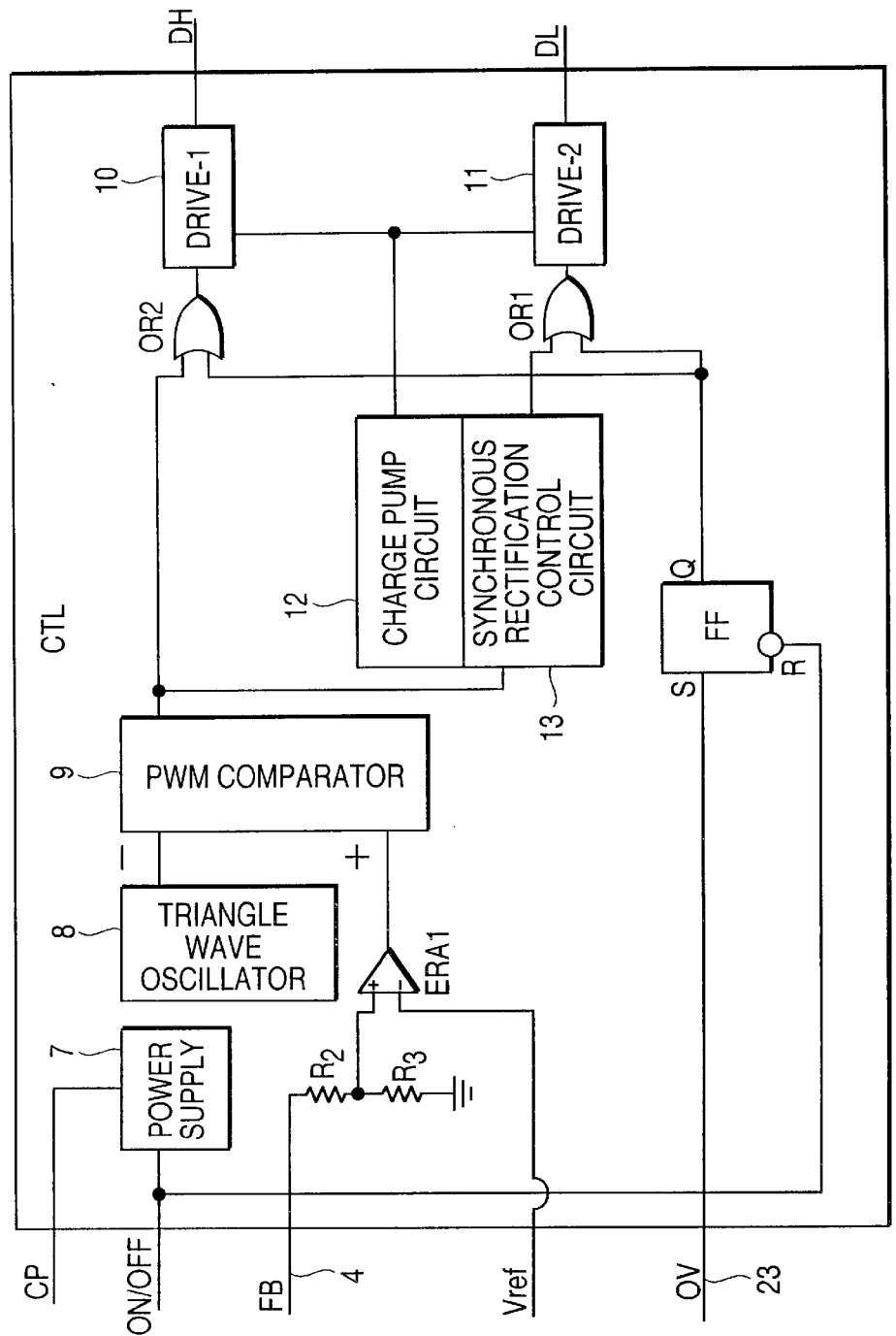
FIG. 2 represents an internal arrangement of a control circuit CTL of the embodiment mode 1.

Referring now to FIG. 2, an internal circuit arrangement of the control circuit CTL will be explained.

(ARRANGEMENT OF CONTROL CIRCUIT CTL)

As indicated in FIG. 2, the control circuit CTL corresponds to a circuit with employment of the pulse width modulation system (PWM system). This control circuit CTL is constructed of a power supply 7, a triangle wave oscillator 8, a PMW comparator 9, a charge pump circuit 12, a synchronous rectification control circuit 13, a flip-flop FF, a drive −1 (10), and another drive −2 (11). The control circuit CTL further includes a dividing resistor R2/R3, an error amplifier ERA1, an OR gate circuit OR1, and another OR gate circuit OR2.

(POWER SUPPLY 7)

Upon re.eipt of the externally supplied ON instruction value, the power supply 7 supplies operation power to the circuit for constituting this control circuit CTL. Upon receipt of the externally supplied OFF instruction value, the power supply 7 interrupts the supply of this operation power to the circuit for constituting the control circuit CTL.

(TRIANGLE WAVE OSCILLATOR 8)

The triangle wave oscillator 8 oscillates a converting triangle wave at a constant frequency, which is used to convert the voltage into the pulse width. The triangle wave oscillated from this triangle wave oscillator 8 is inputted to the PWM comparator 9.

(DIVIDING RESISTOR R2/3)

The dividing resistor R2/R3 is conneted to the signal line 4 so as to accept the output voltage FB from the DC/DC converter. This dividing resistor R2/R3 is a sense resistor for sensing the voltage value of the output voltage FB.

The voltage value sensed by the dividing resistor R2/R3 is entered to the error amplifier ERA1.

(ERROR AMPLIFIER ERA1)

The error amplifier ERA1 is an error amplifying circuit for inputting thereinto the voltage value FB sensed by the dividing resistor R2/R3, and the externally supplied target voltage $V_{ref}$, and for amplifying an error between the voltage FB and the target voltage $V_{ref}$. The error amplified by this error amplifier ERA1 is inputted to the non-inverting input terminal of the PWM comparator 9.

(PWM COMPARATOR 9)

The PWM comparator 9 is a voltage comparator having an inverting input terminal and a non-inverting input terminal. The inverting input terminal of the PWM comparator 9 inputs thereinto the converting triangle wave outputted from the triangle wave oscillator 8. The non-inverting terminal of the PWM comparator 9 inputs thereinto the signal outputted from the error amplifier ERA1.

Then, the PWM comparator 9 compares the signal inputted to the non-inverting input terminal with the signal inputted to the inverting input terminal.

For example, the PWM comparator 9 subtracts the signal inputted to the inverting input terminal from the signal inputted into the non-inverting input terminal. Then, the PWM comparator 9 outputs a signal with a high level while the subtracted value indicates a negative value (namely, while the signal outputted from the triangle wave oscillator 8 is larger than the signal outputted from the error amplifier ERA1).

Also, the PWM comparator 9 outputs a signal with a low level while the subtracted value indicates a positive value (namely, while the signal outputted from the triangle wave oscillator 8 is smaller than the signal outputted from the error amplifier ERA1).

The signal outputted from the PWM comparator 9 (either a low-level signal or a high-level signal) is entered to the OR gate circuit OR2 and the synchronous rectification control circuit 13.

(CHARGE PUMP CIRCUIT 12)

The charge pump circuit 12 applies a voltage for driving the main switching transistor Tr1 to the drive −1 (10), and also another voltage for driving the synchronous rectification transistor Tr2 to the drive −2 (11).

(SYNCHRONOUS RECTIFICATION CONTROL CIRCUIT 13)

The synchronous rectification control circuit 13 inputs thereinto the signal outputted from the PWM comparator 9. Then, the synchronous rectification control circuit 13 turns ON/OFF the synchronous rectification transistor Tr2 to perform the synchronous rectification in response to the signal derived from the PWM comparator 9.

For example, when a signal having a low level derived from the PWM comparator 8 is inputted, the synchronous rectification control circuit 13 outputs a signal having a high level. When a signal having a high level derived from the PWM comparator 8 is inputted, the synchronous rectification control circuit 13 outputs a signal having a low level.

The signals outputted from the synchronous rectification control circuit 13 is inputted to the OR gate circuit OR1.

(FLIP-FLOP FF)

The flip-flop FF owns a set terminal S, a reset terminal R, two input terminals, and an output terminal Q. The set terminal S of the flip-flop FF inputs thereinto the OV outputted from the voltage comparator IC1. At this time, the flip-flop FF stores therein the signal entered into the set terminal S.

Further, the reset terminal R of the flip-flop FF inputs thereinto either the externally ON instruction value or OFF instruction value. When the ON instruction or OFF instruction is inputted into the reset terminal R, the signal stored in the flip-flop FF is reset to a low-level signal.

Furthermore, the output terminal Q of the flip-flop FF is connected to the OR gate circuit OR1 and the OR gate circuit OR2. This output terminal Q outputs the signal stored in the flip-flop FF.

For example, when the input voltage Vi of the DC/DC converter is lower than, or equal to the reference voltage e1, the set terminal S of the flip-flop FF inputs a low-level signal as the OV derived from the voltage comparator IC2. In this case, the flip-flop FF stores therein the low-level signal inputted to the set terminal S, and the output terminal Q thereof outputs the low-level signal stored in this flip-flop FF.

For exwaple, when the input voltage Vi of the DC/DC converter exceeds the reference voltage e1 (namely overvoltage), the set terminal S of the flip-flop FF inputs a high-level signal as the OV derived from the voltage comparator IC2. In this case, the flip-flop FF stores therein the high-level signal inputted to the set terminal S, and the output terminal Q thereof outputs the high-level signal stored in this flip-flop FF.

(OR GATE CIRCUIT OR2)

The OR gate circuit OR2 OR-gates the signal from the PWM comparator 9 and the signal from the flip-flop FF and supplies a signal indicative of this calculation result to the drive −1 (10).

For instance, when the input voltage Vi of the DC/DC converter is lower than, or equal to the reference voltage e1, the OR gate circuit OR2 inputs thereinto the low-level signal from the output terminal Q of the flip-flop FF. In this case, the OR gate circuit OR2 directly outputs the signal derived from the PWM comparator 9. As a result, in the case that the input voltage Vi to the DC/DC converter is-lower than, or equal to the reference voltage e1, the drive −1 (10) is operated in response to the signal derived from the PWM modulator 9.

Also, when the input voltage Vi of the DC/DC converter is larger than, the reference voltage el (namely, overvoltage), the OR gate circuit OR2 inputs thereinto the high-level signal from the output terminal Q of the flip-flop FF. In this case, the OR gate circuit OR2 outputs the high-level signal irrelevant to the signal derived from the PWM comparator 9. As a result, in the case that the input voltage Vi to the DC/DC converter is brought into the overvoltage condition the drive −1 (10) is operated in response to the signal from the flip-flop irrelevant to the signal derived from the PWM modulator 9.

(OR GATE CIRCUIT OR1)

The OR gate circuit OR1 OR-gates the signal outputted from the synchronous rectification control circuit 13 and the signal outputted from the flip-flop FF, and outputs a signal indicative of this calculation result. The signal outputted from this OR gate circuit OR1 is inputted to the drive −2 (11).

For instance, when the input voltage Vi of the DC/DC converter is lower than, or equal to the reference voltage e1, the OR gate circuit OR1 inputs thereinto the low-level signal from the flip-flop FF. In this case, the OR gate circuit OR1 directly outputs the signal derived from the synchronous rectification control circuit 13. As a result, in the case that the output voltage FB is lower than, or equal to the reference voltage e1, the drive −1 (10) is operated in response to the signal derived from the synchronous rectification control circuit 13.

Also, when the input voltage Vi of the DC/DC converter is larger than the reference voltage e1 (namely, overvoltage), the OR gate circuit OR1 inputs thereinto the high-level signal from the flip-flop FF. In this case, the OR gate circuit OR1 directly outputs the high-level signal, irrelevant to the signal derived from the synchronous rectification control circuit 13. As a result, in the case that the input voltage Vi to the DC/DC converter becomes the overvoltage, the drive −2 (11) is operated in response to the high-level signal derived from the flip-flop FF, irrelevant to the signal derived from the synchronous rectification control circuit 13.

(DRIVE −1 (10))

In response to the signal from the OR gate circuit OR2, the drive −1 (10) turns ON/OFF the main switching transistor Tr1.

For example, when the high-level signal from the OR gate circuit OR2 is inputted, the drive −1 (10) supplies the power supplied from the charge pump circuit 12 to the main switching transistor Tr1, so that the main switching transistor Tr1 is brought into the ON state.

Also, when the low-level signal from the OR gate circuit OR2 is inputted, the drive −1 (10) interrupts the supply of power to the main switching transistor Tr1, so that this main switching transistor Tr1 is brought into the OFF state.
(DRIVE −2 (11))

In response to the signal from the OR gate circuit OR1, the drive −2 (11) turns ON/OFF the synchronous rectification transistor Tr2.

For example, when the high-level signal from the OR gate circuit OR1 is inputted, the drive −2 (11) supplies the power supplied from the charge pump circuit 12 to the synchronous rectification transistor Tr2, so that the synchronous rectification transistor Tr2 is brought into the ON state.

Also, when the low-level signal from the OR gate OR1 is inputted, the drive −2 (11) interrupts the supply of power to the synchronous rectification transistor Tr2, so that this synchronous rectification transistor Tr2 is brought into the OFF state.
(OPERATION/EFFECTS OF EMBODIMENT MODE 1)

A description will now be made of operation/effects of the first DC/DC converter according to the first embodiment of the present invention.
(1) IN A CASE THAT FIRST DC/DC CONVERTER IS OPERABLE UNDER NORMAL CONDITION In a case that the first DC/DC converter is normally operated, namely when the input voltage Vi to the DC/DC converter indicates the normal voltage value, since the input voltage Vi becomes sufficiently lower than the reference voltage e1, the OV from the voltage comparator IC1 becomes a signal indicative of a low level.

In this case, the low-level signal outputted from the voltage comparator IC1 is inputted to the set terminal S of the flip-flop FF of the control circuit CTL. Then, the flip-flop FF stores the inputted low-level signal.

When the flip-flop PF stores the low-level signal, the output terminal Q of the flip-flop FF outputs a low-level signal.

The low-level signal outputted from the output terminal Q of the flip-flop FF is entered into the OR gate circuit OR2 and the OR gate OR1 of the control circuit CTL.

The dividing resistor R2/R3 of the control circuit CTL inputs thereinto the output voltage FB from the DC/DC converter via the signal line 4. Then, the dividing resistor R2/R3 senses the entered output voltage FB, and enters the sensed voltage value to the error amplifier ERA1.

The error amplifier ERA1 into which the voltage value from the dividing resistor R2/R3 is inputted amplifies an error between the voltage value derived from the dividing resistor R2/R3 and the externally supplied target voltage $V_{ref}$ to output the amplified error signal. The error signal outputted from the error amplifier ERA1 is inputted to the PWM comparator 9.

The PWM comparator 9 inputs thereinto the error signal from the error amplifier ERA1, and also inputs thereinto the converting triangle wave from the triangle wave oscillator 8. When the error signal from the error amplifier ERA1 is smaller than the converting triangle wave from the triangle wave oscillator 8, the PWM comparator 9 outputs a high-level signal.

When the error signal from the error amplifier ERA1 is larger than the converting triangle wave from the triangle wave oscillator 8, the PWM comparator 9 outputs a low-level signal.

The signal outputted from the PWM comparator 9 is inputted to the OR gate circuit OR2 and the synchronous rectification control circuit 13.

When the signal derived from the PWM comparator 9 is a high-level signal, the synchronous rectification control circuit 13 for inputting thereinto the signal from the PWM comparator 9 outputs a low-level signal. On the other hand, when the signal derived from the PWM comparator 9 is a low-level signal, the synchronous rectification control circuit 13 outputs a high-level signal. The signal outputted from this synchronous rectification control circuit 13 is inputted to the OR gate circuit OR1.

As described above, the OR gate circuit OR2 inputs thereinto the low-level signal from the flip-flop FF and the signal from the PWM comparator 9 (either high-level signal or low-level signal), whereas the OR gate circuit OR1 inputs thereinto the low-level signal from the flip-flop FF and the signal from the synchronous rectification control circuit 13 (either high-level signal or low-level signal).

Since the OR gate circuit OR2 inputs thereinto the low-level signal from the flip-flop FF, this OR gate circuit OR2 directly outputs the signal derived from the PWM comparator 9. For instance, when the high-level signal from the PWM comparator 9 is inputted, the OR gate circuit OR2 outputs a high-level signal. Also, when the low-level signal from the PWM comparator 9 is entered, the OR gate circuit OR2 outputs a low-level signal.

The signal outputted from the OR gate circuit OR2 is entered into the drive −1 (10).

If the signal from the OR gate circuit OR2 is the low-level signal, then the drive −1 (10) into which the signal from the OR gate circuit OR2 is inputted interrupts the supply of power to the main switching transistor Tr1. At this time, the main switching transistor Tr1 is brought into the OFF state to thereby disconnect between the signal line 14 and the signal line 1.

When the signal from the OR gate circuit OR2 is the high-level signal, the drive −1 (10) supplies the power from the charge pump circuit 12 to the main switching transistor Tr1. At this time, the main switching transistor Tr1 is brought into the ON state to thereby connect between the signal line 14 and the signal line 1.

The OR gate circuit OR1 into which the low-level signal from the flip-flop FF and the signal from the synchronous rectification control circuit 13 are inputted directly outputs the signal (either high-level signal or low-level signal) derived from the synchronous rectification control circuit 13.

The signal outputted from the OR gate circuit OR1 is entered into the drive −2 (11).

If the signal from the OR gate circuit OR1 is the low-level signal, then the drive −2 (11) into which the signal from the OR gate circuit OR1 is inputted interrupts the supply of power to the synchronous rectification transistor Tr2. At this time, the synchronous rectification transistor Tr2 is brought to the OFF state to thereby disconnect between the signal line 2 and the signal line 26.

When the signal from the OR gate circuit OR1 is the high-level signal, the drive −2 (11) supplies the power from the charge pump circuit 12 to the synchronous rectification transistor Tr2. At this time, the synchronous rectification transistor Tr2 is brought into the ON state to thereby connect between the signal line 2 and the signal line 26.
(2) IN A CASE THAT INPUT VOLTAGE TO FIRST DC/DC CONVERTER IS UNDER OVERVOLTAGE CONDITION In such a case that a voltage Vi inputted to the first DC/DC converter becomes an overvoltage, since the input voltage Vi is higher than the reference voltage e1, the signal OV derived from the voltage comparator IC1 is a signal indicative of a high level.

The high-level signal outputted from the voltage comparator IC1 is inputted to the set terminal S of the flip-flop FF of the control circuit CTL. At this time, the flip-flop FF stored the high-level signal inputted to the set terminal S. Then the flip-flop FF outputs the stored high-level signal from the output terminal Q of the flip-flop FF.

The high-level signal outputted from the output terminal Q of the flip-flop FF is entered into the OR gate circuit OR2 and the OR gate OR1 of the control circuit CTL.

The dividing resistor R2/R3 of the control circuit CTL inputs thereinto the output voltage FB from the DC/DC converter via the signal line 4. Then, the dividing resistor R2/R3 senses the entered output voltage FB, and enters the sensed voltage value to the error amplifier ERA1.

The error amplifier ERA1 into which the voltage value from the dividing resistor R2/R3 is inputted amplifies an error between the voltage value derived from the dividing resistor R2/R3 and the externally supplied target voltage $V_{ref}$ to output the amplified error signal. The error signal outputted from the error amplifier ERA1 is inputted to the PWM comparator 9.

The PWM comparator 9 inputs thereinto the error signal from the error amplifier ERA1, and also inputs the converting triangle wave from the triangle wave oscillator 8. When the error signal from the error amplifier ERA1 is smaller than the converting triangle wave from the triangle wave oscillator 8, the PWM comparator 9 outputs a high-level signal.

When the error signal from the error amplifier ERA1 is larger than the converting triangle wave from the triangle wave oscillator 8, the PWM comparator 9 outputs a low-level signal.

The signal outputted from the PWM comparator 9 is inputted to the OR gate circuit OR2 and the synchronous rectification control circuit 13.

When the signal derived from the PWM comparator 9 is a high-level signal, the synchronous rectification control circuit 13 for inputting thereinto the signal from the PWM comparator 9 outputs a low-level signal. On the other hand, when the signal derived from the PWM comparator 9 is a low-level signal, the synchronous rectification control circuit 13 outputs a high-level signal. The signal outputted from this synchronous rectification control circuit 13 is inputted to the OR gate circuit OR1.

As described above, the OR gate circuit OR2 inputs thereinto the high-level signal from the flip-flop FF and the signal from the PWM comparator 9 (either high-level signal or low-level signal), whereas the OR gate circuit OR1 inputs thereinto the high-level signal from the flip-flop FF and the signal from the synchronous rectification control circuit 13 (either high-level signal or low-level signal).

In this case, since the OR gate circuit OR2 inputs thereinto the high-level signal derived from the flip-flop FF, this OR gate circuit OR2 outputs a high-level signal irrelevant to the signal supplied from the PWM comparator 9.

The high-level signal outputted from the OR gate OR2 is Inputted into the drive −1 (10).

The drive −1 (10) into which the high-level signal from the OR gate circuit OR2 is inputted supplies the power from the charge pump circuit 12 to the main switching transistor Tr1. At this time, the main switching transistor Tr1 is brought into the ON state to thereby connect between the signal line 14 and the signal line 1.

Further, since the high-level signal from the flip-flop FF is inputted into the OR gate circuit OR1, this OR gate circuit OR1 outputs a high level signal irrelevant to the signal (either high-level signal or low-level signal) from the synchronous rectification control circuit 13.

The high-level sigl outputted from the OR gate circuit OR1 is entered into the drive −2 (11) The drive −2 (11) into which the high-level signal from the OR gate circuit OR1 is inputted supplies the power from the charge pump circuit 12 to the synchronous rectification transistor Tr2. At this tine, the synchronous rectification transistor Tr2 is brought into the ON state to thereby connect between the signal line 2 and the signal line 26.

When both the main switching transistor Tr1 and the synchronous rectification transistor Tr2 are brought into the ON state, the current from the cell may flow through the fuse F1, the signal line 14, the main switching transistor Tr1, the signal line 1, the signal line 2, the synchronous rectification transistor Tr2, and the signal line 26 to the ground. At this time, an overcurrent will flow through the fuse F1, so that this fuse F1 is melted down.

As a result, since the fuse F1 is melted down, it is possible to prevent the constructive elements of the first DC/DC converter, especially the capacitor C3 provided in the input unit of this DC/DC converter from being applied the excessive high voltages. Therefore, it is possible to avoid that the capacitor C3 would be burned out.

Further, in accordance with this first DC/DC converter, when the power supply of the control circuit CTL could not produce the drive power for the main switching transistor Tr1 and the synchronous rectification transistor Tr2, these main switching transistor Tr1 and synchronous rectification transistor Tr2 are driven by the power stored in the capacitor C2. As a consequence, the DC/DC converter can assure the operations of the main switching transistor Tr1 and the synchronous rectification transistor Tr2 until the fuse F1 is melt down.

It should be noted that the power supply used to drive the main switching transistor Tr1 and the synchronous rectification transistor Tr2 are not limited to the capacitor C3.

According to the DC/DC converter of this first embodiment, no longer the high withstanding voltage type organic capacitor is required as the capacitor C3. Moreover, the burn-out preventing fuse is not required, but also a total number of constructive elements could be reduced.

In addition, since the burn-out preventing fuse for the capacitor C3 is not required, the resistance value of the first DC/DC converter would be lowered, so that the converting efficiency of the DC/DC converter could be increased.

(ANOTHER EMBODIMENT MODE OF FIRST DC/DC CONVERTER)

Figure 3:
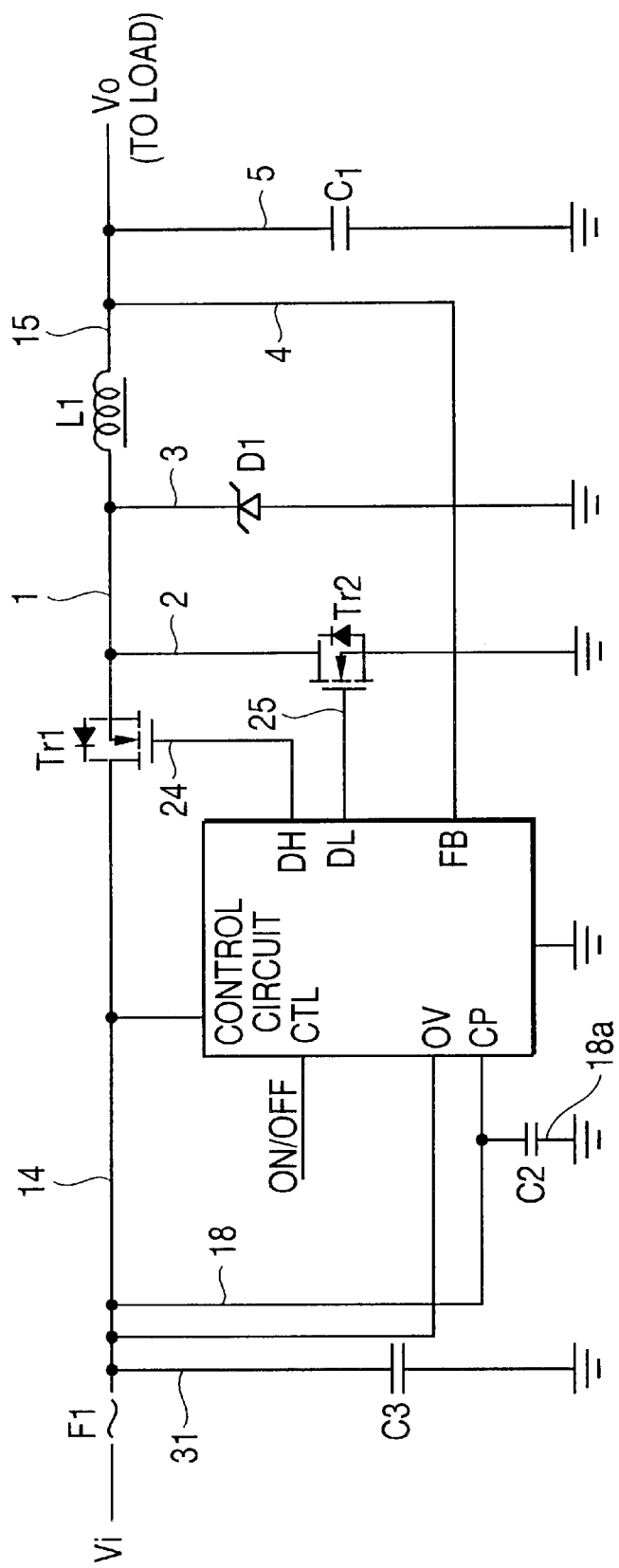
FIG. 3 schematically shows an arrangement of a DC/DC converter according to another embodiment mode of the present invention.
Figure 4:
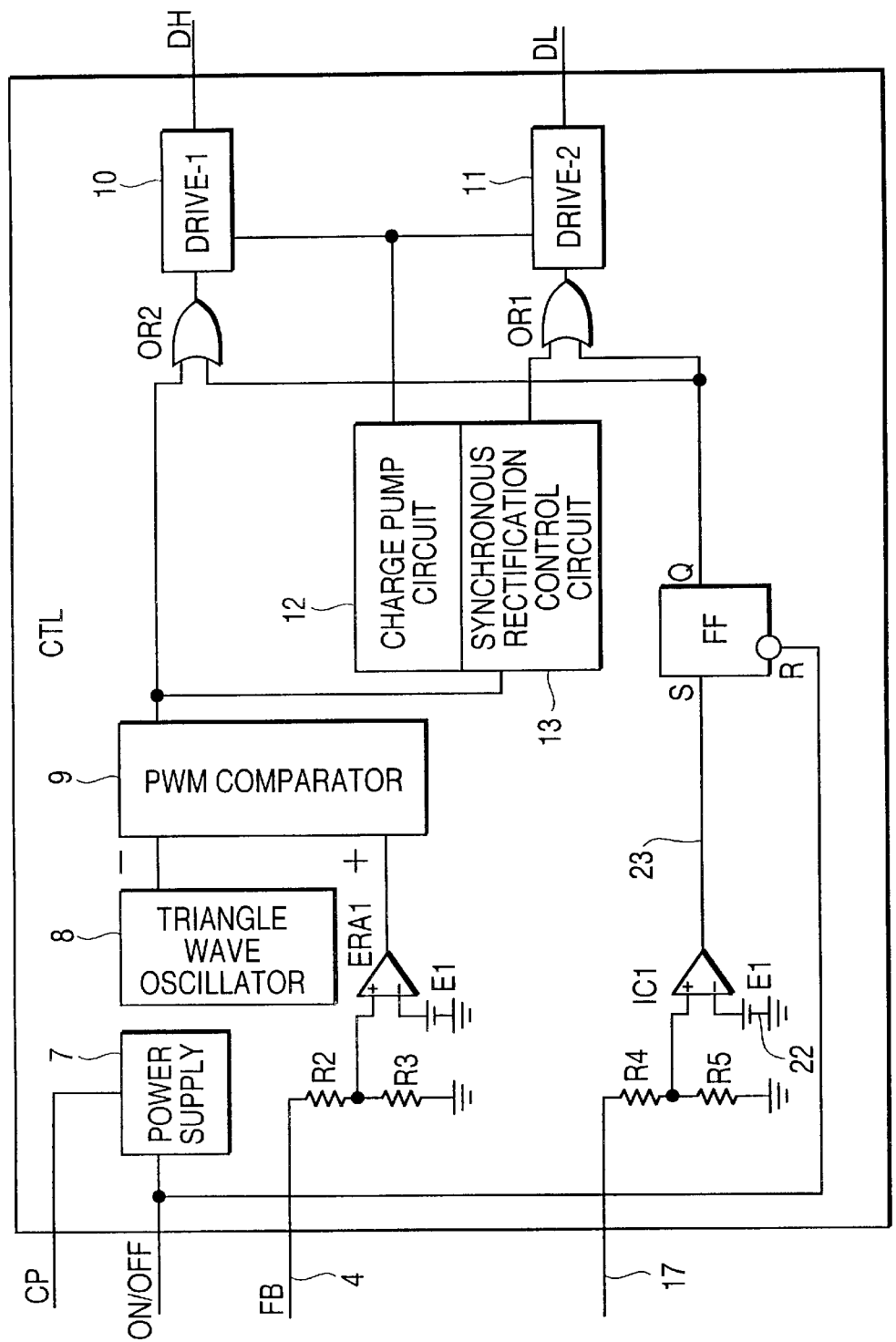
FIG. 4 represents an internal arrangement of a control circuit CTR corresponding to the DC/DC converter of FIG. 3.
Figure 5:
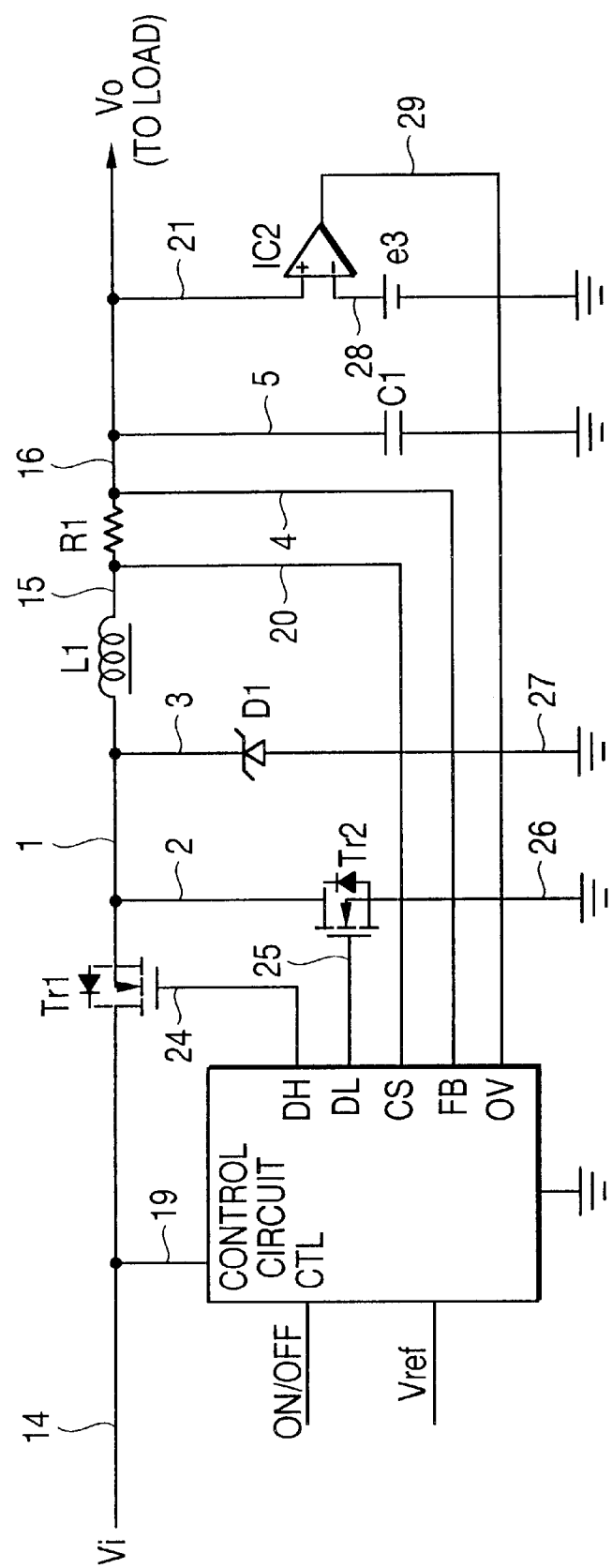
FIG. 5 schematically indicates an arrangement of a DC/DC converter according to an embodiment mode 2 of the present invention.

In the DC/DC converter according to the embodiment mode 1, the voltage comparator IC1 and the power supply e1 are provided independent from the control circuit CTL. Alternatively, as represented in FIG. 3 and FIG. 4, the voltage comparator IC1 and the power supply e1 may be employed within the control circuit CTL.

In this case, the signal line 17 is directly connected to the control circuit CTL. Then, a voltage "Vi" entered via the signal line 17 into the control circuit CTL is applied to a dividing resistor R4/R5.

The dividing resistor R4/R5 is a resistor for sensing the voltage Vi inputted via the signal line 17. The voltage Vi sensed by this dividing resistor R4/R5 is inputted to the non-inverting input terminal of the voltage comparator IC1.

The inverting input terminal of the voltage comparator IC1 is connected via a signal line 22 to the power supply e1.

Further, the output terminal of the voltage comparator IC1 is connected via a sinal line 23 to the set terminal S of the flip-flop FF.

When the control circuit CTL is arranged in the above-described manner, if the voltage Vi supplied from the cell becomes the overvoltage, then the voltage Vi under overvoltage state is inputted to the dividing resistor R4/R5 of the control circuit CTL.

The dividing resistor R4/R5 senses the voltage value of this voltage Vi under overvoltage state. The voltage value sensed by this dividing resistor R4/R5 is inputted to the non-inverting input terminal of the voltage comparator IC1.

The voltage comparator IC1 subtracts the reference voltage derived from the power supply e1 from the voltage value derived from the dividing resistor R4/R5. At this time, since the voltage value from the dividing resistor R4/R5 becomes higher than the reference voltage, the voltage comparator IC1 outputs a high-level signal.

As a result, the high-level signal outputted from the voltage comparator IC1 is inputted to the set terminal S of the flip-flop FF.

As described, even when both the voltage comparator IC1 and the power supply e1 are build in the control circuit CTL, it is possible to achieve an effect similar to that of the above-explained embodiment mode 1.

In the example shown in FIG. 3 and FIG. 4, the control circuit CTL contains another power e2 for producing the target voltage $V_{ref}$.

As described above, when the circuit arrangement as shown in FIG. 3 and FIG. 4 is employed, a similar effect to that of the embodiment mode 1 can be achieved, and also the circuit arrangement of the DC/DC converter can be made simple.

EMBODIMENT MODE 2

FIG. 2 is a schematic diagram for showing a DC-to-DC converter according to a second embodiment mode 2 of the present invention. It should be noted that the same reference numerals used in the first DC/DC converter will be employed as those for denoting the same or similar constructive elements in the following embodiment modes.

A DC/DC converter is provided between a cell functioning as a power supply and a load.
(ARRANGEMENT OF SECOND DC/DC CONVERTER)

The DC/DC converter according to this embodiment mode 2 is constructed of, a control circuit CTL, a main switching transistor Tr1, a synchronous rectification transistor Tr2, a diode D1, a choke coil L1, a capacitor C1, a voltage comparator IC2, and a power supply e3 for producing a reference voltage e3.
(CIRCUIT CONNECTIONS FOR SECOND DC/DC CONVERTER)

Now, connection modes of the above-described constructive elements will be described.

The main switching transistor Tr1 is connected via a signal line 14 to a call. This main switching transistor Tr1 is connected via another signal line 1 to the choke coil L1, and via another signal line 24 to the control circuit CTL.

The choke coil L1 connected via the signal line 1 with the main switching transistor Tr1 is further connected via the signal line 15 is to a resistor R1.

The resistor R1 is connected via the signal line 16 to the load.

A signal line 19 is connected to a half way of the above-described signal line 14. This signal line 19 is connected to the control circuit CTL.

Two signal lines 2 and 3 are connected to a half way of the signal line 1 used to connect the main switching transistor Tr1 with the choke coil L1.

The signal line 2 located near the main switching transistor Tr1 among the two signal lines 2 and 3 is connected to the synchronous rectification transistor Tr2. This synchronous rectification transistor Tr2 is connected via the signal line 25 to the control circuit CTL, and via a signal line 26 to the ground.

The signal line 3 located near the choke coil L1 among the two signal lines 2 and 3 is connected to the cathode terminal of the diode D1. The anode terminal of this diode D1 is connected via a signal line 27 to the ground.

Further, a signal line 20 is connected to a half way of the signal line 15 for connecting the choke coil C1 to the resistor R1.

The above-described signal line 20 is connected to the control circuit CTL, and may function as a signal line for supplying a voltage CS which is inputted to the resister R1 to the control circuit CTL.

Three signal lines 4, 5, 21 are connected to a half way of the signal line 16 for connecting the resistor R1 with the load.

The signal line 4 located near the resistor R1 among the three signal lines 4, 5, 21 is connected to the control circuit CTL. This signal line 4 is a signal line used to feed back the voltage value FB outputted from the second DC/DC converter to the control circuit CTL.

The center signal line 5 among the three signal lines 4, 5, 21 is connected via the smoothing capacitor C1 to the ground.

The signal line 21 located near the load among the above-described three signal lines 4, 5, 21 is connected to the voltage comparator IC2. This voltage comparator IC2 owns, for example, a non-inverting input terminal, an inverting input terminal, and an output terminal. In this case, the signal line 21 is connected to the non-inverting input terminal of the voltage comparator IC2. The inverting input terminal of the voltage comparator IC2 is connected via another signal line 28 to the power supply e3. Furthermore, the output terminal of the voltage comparator IC2 is connected via a signal line 29 to the control circuit CTL.
(CIRCUIT FUNCTIONS OF SECOND DC/DC CONVERTER)

Then, functions of the above-described respective constructive elements will now be explained. It should be understood that explanations about the same constructive elements as those of the embodiment mode 1 are omitted.
(RESISTOR R1)

The resistor R1 is a sense resistor for sensing an output current value of the second DC/DC converter.
(POWER SUPPLY e3)

The power supply e3 produces a reference voltage e3 of the voltage outputted from the second DC/DC converter.
(VOLTAGE COMPARATOR IC2)

The voltage comparator IC2 inputs thereinto the output voltage of the second DC/DC converter via the signal line 21, and at the same time, inputs thereinto the reference voltage e3 derived from the power supply e3. Then, the voltage comparator IC2 compares the output voltage of the second DC/DC converter with the reference voltage e3 from the power supply e3, and then outputs a 0V indicative of the comparison result.

For instance, the voltage comparator IC2 subtracts the reference voltage e3 from the output voltage of the second DC/DC converter, and then outputs a low-level signal when the subtraction result is lower than, or equal to "0", or outputs a high level signal when the subtraction result is a positive value.
(CONTROL CIRCUIT CTL)

The ON instruction value, or the OFF instruction value, and the target voltage $V_{ref}$ are externally entered into the control circuit CTL in addition to the above-described signal lines 19, 23, 25, 4, 20, 29. The externally applied target voltage $V_{ref}$ is a reference voltage to be outputted from the DC/DC converter.

Then, the control circuit CTL controls turning ON/OFF of the main switching transistor Tr1 and the synchronous rectification transistor Tr2 in response to the OV derived from the voltage comparator IC2, the output voltage FB inputted via the signal line 4, and the target voltage $V_{ref}$ of the voltage to be outputted from the DC/DC converter.

An internal circuit arrangement of the control circuit CTL will be explained.

(ARRANGEMENT OF CONTROL CIRCUIT CTL)

Figure 6:
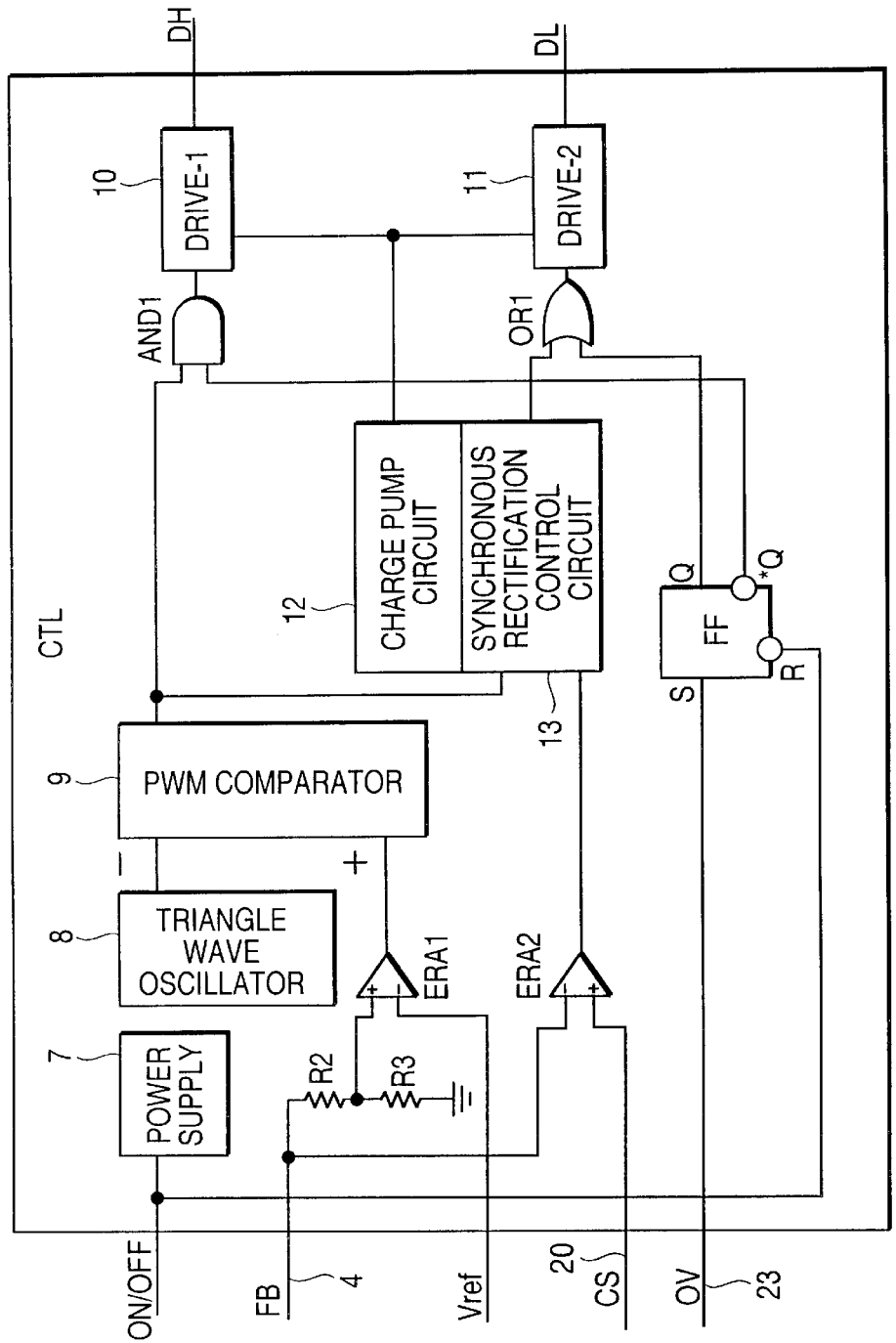
FIG. 6 represents an internal arrangement of a control circuit CTL of the embodiment mode 2.

As indicated in FIG. 6, the control circuit CTL corresponds to a circuit with employment of the pulse width modulation system (PWM system). This control circuit CTL is constructed of a power supply 7, a triangle wave oscillator 8, a PMW comparator 9, a charge pump circuit 12, a synchronous rectification control circuit 13, a flip-flop FF, a drive −1 (10), and another drive −2 (11). The control circuit CTL further includes a dividing resistor R2/R3, error amplifiers ERA1 and ERA2, an AND gate circuit AND1, and an OR gate circuit OR1.

(PWM COMPARATOR 9)

The PWM comparator 9 is a voltage comparator having an inverting input terminal and a non-inverting input terminal. The inverting input terminal of the PWM comparator 9 inputs thereinto the converting triangle wave outputted from the triangle wave oscillator 8. The non-inverting terminal of the PWM comparator 9 inputs thereinto the signal outputted from the error amplifier ERA.

Then, the PWM comparator 9 compares the signal inputted to the non-inverting input terminal with the signal inputted to the inverting input terminal.

For example, the PWM comparator 9 subtracts the signal inputted to the inverting input terminal from the signal inputted into the non-inverting input terminal. Then, the PWM comparator 9 outputs a signal with a high level while the subtracted value indicates a negative value (namely, while the signal outputted from the triangle wave oscillator 8 is larger than the signal outputted from the error amplifier ERA1).

Also, the PWM comparator 9 outputs a signal with a low level while the subtracted value indicates a positive value (namely, while the signal outputted from the triangle wave oscillator 8 is smaller than the signal outputted from the error amplifier ERA1).

The signal outputted from the PWM comparator 9 is entered to the AND gate circuit AND1 and the synchronous rectification control circuit 13.

(ERROR AMPLIFIER ERA2)

The error amplifier ERA2 inputs thereinto the voltage FB which is outputted from the resister R1 via the signal line 4, and at the same time, inputs thereinto the voltage CS which is inputted to the resister R1 via the signal line 20.

This error amplifier ERA2 is an error amplifier circuit for a voltage drop of the resistor R1 based upon the voltage CS which is inputted to the resister R1 and the output voltage FB of the DC/DC converter.

The voltage value outputted from the error amplifier ER2 is inputted to the synchronous rectification control circuit 13.

(SYNCHRONOUS RECTIFICATION CONTROL CIRCUIT 13)

The synchronous rectification control circuit 13 inputs thereinto the signal outputted from the PWM comparator 9 and the signal outputted from the error amplifier ERA2. Then, the synchronous rectification control circuit 13 turns ON/OFF the synchronous rectification transistor Tr2 to perform the synchronous rectification in response to the signal derived from the PWM comparator 9, and the signal from the error amplifier ERA2.

For example, when a signal having a low level derived from the PWM comparator 8 is inputted and only when the signal from the error amplifier ERA2 is below a constant value, the synchronous rectification control circuit 13 outputs a signal having a high level.

The signals outputted from the synchronous rectification control circuit 13 is inputted to the OR gate circuit OR1.

(FLIP-FLOP FF)

The flip-flop FF owns two input terminals as a set terminal S and a reset terminal R, and two output terminals as a non-inverting output terminal Q and an inverting output terminal *Q. The set terminal S of the flip-flop FF inputs thereinto the OV outputted from the voltage comparator IC2. At this time, the flip-flop FF stores therein the signal entered into the set terminal S.

The reset terminal R of the flip-flop FF inputs thereinto either the externally ON instruction value or OFF instruction value. When the ON instruction or OFF instruction is inputted into the reset terminal R, the signal stored in the flip-flop FF is reset to a low-level signal.

Furthemore, the non-inverting output terminal Q of the flip-flop FF is connected to the OR gate circuit OR1. This output terminal Q directly outputs the signal stored in the flip-flop FF.

For example, when the output voltage FB of the DC/DC converter is lower than, or equal to the reference voltage e3, the set terminal S of the flip-flop FF inputs a low-level signal as the OV derived from the voltage comparator IC2. In this case, the flip-flop FF stores therein the low-level signal inputted to the set terminal S, and the non-inverting output terminal Q thereof outputs the low-level signal stored in this flip-flop FF.

For example, when the output voltage FB of the DC/DC converter exceeds the reference voltage e3 (namely overvoltage), the set terminal S of the flip-flop FF inputs a high-level signal as the OV derived from the voltage comparator IC2. In this case, the flip-flop FF stores therein the high-level signal inputted to the set terminal S, and the non-inverting output terminal Q thereof outputs the high-level signal stored in this flip-flop FF.

The inverting output terminal *Q of the flip-flop FF is connected to the AND gate circuit AND1. This inverting output terminal *Q outputs such a value produced by inverting the signal value stored in the flip-flop FF, namely signals whose high leval and low level are inverted are outputted.

For instance, the inverting output terminal *Q outputs a high-level signal when the OV stored in the flip-flop FF is the low-level signal (output voltage FB of DC/DC converter is lower than, or equal to reference voltage e3). Also, the inverting output terminal *Q outputs a high-level signal when the OV stored in the flip-flop FF is a high-level signal (if the output voltage FB of the DC/DC converter exceeds the refer voltage e3).

(AND GATE CIRCUIT AND1)

The AND gate circuit AND1 inputs thereinto the signal outputted from the PWM comparator 9 and the signal outputted from the inverting output terminal *Q of the flip-flop FF. This AND gate circuit AND1 AND-gates the signal derived from the PWM comparator 9 and the signal from the flip-flop FF to thereby output a signal indicative of this calculation result. The signal outputted from the AND gate circuit AND1 is entered to the drive −1 (10).

For instance, when the output voltage FB from the DC/DC converter is lower than, or equal to the referene voltage e3, the AND gate circuit AND1 inputs a high-level signal from the inverting output terminal *Q of the flip-flop FF. In this case, the AND gate circuit AND1 directly outputs the signal from the PWM comparator 9. As a result, when the output voltage FB is lower than, or equal to the reference voltage e3, the drive −1 (10) is operated in response to the signal from the PWM comparator 9.

Also, when the output voltage FB from the DC/DC converter is higher than the reference voltage e3, the AND gate circuit AND1 inputs a low-level signal from the inverting output terminal *Q of the flip-flop FF. In this case, the AND gate circuit AND1 outputs a low-level signal, irrelevant to the signal from the PWM comparator 9. As a result, when the output voltage FB becomes the overvoltage, the drive −1 (10) is operated in response to the low-level signal from the flip-flop FF irrelevant to the signal from the PWM comparator 9.

(OR GATE CIRCUIT OR1)

The OR gate circuit CR1 inputs thereinto the signal outputted from the synchronous rectification control circuit 13 and the signal outputted from the non-inverting output terminal Q of the flip-flop FF. The OR gate circuit OR1 OR-gates the signal outputted from the synchronous rectification control circuit 13 and the signal outputted from the flip-flop FF, and outputs a signal indicative of this calculation result. The signal outputted from this OR gate circuit OR1 is inputted to the drive −2 (11).

For instance, when the output voltage FB of the DC/DC converter is lower than, or equal to the reference voltage e3, the OR gate circuit OR1 inputs thereinto the low-level signal from the non-inverting output terminal Q of the flip-flop FF. In this case, the OR gate circuit OR1 directly outputs the signal derived from the synchronous rectification control circuit 13. As a result, in the case that the output voltage FB is lower than, or equal to the reference voltage e3, the drive −2 (11) is operated in response to the signal derived from the synchronous rectification control circuit 13.

Also, when the output voltage Fs of the DC/DC converter is larger than the reference voltage e3 (namely, overvoltage), the OR gate circuit OR1 inputs thereinto the high-level signal from the non-inverting output terminal Q of the flip-flop FF. In this case, the OR gate circuit OR1 directly outputs the high-level signal, irrelevant to the signal derived from the synchronous rectification control circuit 13. As a result, in the case that the output voltage FB becomes the overvoltage, the drive −2 (11) is operated in response to the high-level signal derived from the flip-flop FF, irrelevant to the signal derived from the synchronous rectification control circuit 13.

(DRIVE −1 (10))

In response to the signal from the AND gate circuit AND1, the drive −1 (10) turns ON/OFF the main switching transistor Tr1.

For example, when the high-level signal from the AND gate circuit AND1 is inputted, the drive −1 (10) supplies the power supplied from the charge pump circuit 12 to the main switching transistor Tr1, so that the main switching transistor Tr1 is brought into the ON state.

Also, when the low-level signal from the AND gate circuit AND1 is inputted, the drive −1 (10) interrupts the supply of power to the main switching translator Tr1, so that this main switching transistor Tr1 is brought into the OFF state (OPERATION/EFFECTS OF EMBODIMENT MODE 2)

A description will now be made of operation/effects of the second DC/DC converter according to the second embodiment of the present invention.

(1) IN A CASE THAT SECOND DC/DC CONVERTER IS OPERABLE UNDER NORMAL CONDITION

In a case that the second DC/DC converter is normally operated, namely when the output voltage FB from the DC/DC converter indicates the normal voltage value, since the output voltage FB becomes sufficiently lower than the reference voltage e3, the voltage comparator IC2 outputs a signal indicative of a low level.

In this case, the low-level signal outputted from the voltage comparator IC2 is inputted to the set terminal S of the flip-flop FF of the control circuit CTL. Then, the flip-flop FF stores the inputted low-level signal. At this time, the non-inverting output terminal Q of the flip-flop FF outputs the low-level signal stored in the flip-flop FF. The inverting output terminal *Q of the flip-flop FF outputs a high-level signal.

The low-level signal outputted from the non-inverting output terminal Q of the flip-flop FF is inputted to the OR gate circuit OR1. In this case, the OR gate circuit OR1 directly outputs the signal (low-level signal or high-level signal) derived from the synchronous rectification control circuit 13. The signal outputted from the OR gate circuit OR1 is inputted to the drive −2 (11).

The drive −2 (11) turn ON/OFF the synchronous rectification transistor Tr2 in response to the signal from the OR gate circuit OR1, namely the signal from the synchronous rectification control circuit 13. As a result, the drive −2 (11) can turn ON the synchronous rectification transistor Tr2 during a time prriod while the main switching transistor Tr1 is under OFF state, and the diode D1 discharges the energy stored in the choke coil L1 to the output side.

The high-level signal outputted from the inverting output terminal *Q of the flip-flop FF is inputted into the AND gate circuit AND1. In this case, the AND gate circuit AND1 directly outputs the signal (low-level signal, or high-level signal) derived from the PWM comparator 9. The signal outputted from this AND gate circuit AND1 is entered into the drive −1 (10). The drive −1 (10) turns ON/OFF the main switching transistor Tr1 in response to the signal derived from the AND gate circuit AND 1, namely the signal from the PWM comparator 9. As a result, the drive −1 (10) turns ON the main switching transistor Tr1 when the triangle wave from the triangle wave oscillator 8 is higher than the voltage value derived from the error amplifier ER1, whereas the drive −1 (10) turned OFF the main switching transistor Tr1 when the triangle wave from the triangle oscillator 8 is lower then the voltage value derived from the error amplifier ERA 1.

(2) IN A CASE THAT SIGNAL LINE 4 IS DISCONNECTED

In such a case that the signal line 4 is disconnected, the control circuit CTL cannot enter therein the output voltage FB from the second DC/DC converter. At this time, no voltage is applied to the dividing resistor R2/R3 of the control circuit CTL. As a result, a value of a signal outputted from the dividing resistor R2/R3 becomes smaller than the target voltage $V_{ref}$.

When the value of the signal. outputted from the dividing resistor R2/R3 becomes smaller than the target voltage $V_{ref}$, the error amplifier ERA1 outputs a signal with a value indicative of a negative value. At this time, the value outputted from the error amplifier ERA1 becomes smaller than the triangle wave oscillated from the triangle wave oscillator 8.

When the signal value derived from the error amplifier ERA1 becomes smaller than the triangle wave derived from the triangle wave oscillator 8, the PWM comparator 9 outputs a high-level signal. The high-level signal outputted from the PWM comparator 9 is inputted to the AND gate circuit AND1.

On the other hand, since the output voltage from the DC/DC converter is sufficiently lower than the reference voltage e3 of the power supply e3, the voltage comparator IC2 outputs a low-level signal.

The low-level signal outputted from the voltage comparator IC2 is inputted to the set terminal S of the flip-flop FF of the control circuit CTL. At this time, the inverting output terminal *Q of the voltage comparator IC2 outputs a high-level signal. The high-level signal outputted from the inverting output terminal *Q of the flip-flop FF is inputted into the AND gate circuit AND1.

As described above, the AND gate circuit AND1 inputs thereinto the high-level signal from the PWM comparator 9 and the high-level signal from th flip-flop FF. At this time, the AND gate circuit AND1 outputs a high-level signal. This high-level signal outputted from the AND gate circuit AND1 is entered into the drive −1 (10).

The drive −1 (10) for entering therain the high-level signal supplies the drive power from the charge pump circuit 12 to the main switching transistor Tr1 so as to turn ON this main switching transistor Tr1.

On the other hand, since the signal line 4 is brought into the disconnect condition, the control circuit CTL continues the control for increasing the output voltage FB in the above-described manner, while could not recognize the output voltage FB of the DC/DC converter. As a result, the output voltage of the DC/DC converter is actually increased. Therefore, there is a risk that the overvoltage state happens to occur.

When the output voltage from the DC/DC converter is under overvoltage state, since the output voltage becomes higher than the reference voltage e3, the voltage comparator IC2 outputs a high-level signal. The high-level signal outputted from the voltage comparator IC2 is inputted to the set terminals of the flip-flop FF of the control circuit CTL.

The flip-flop FF stores therein the high-level signal inputted into the set terminal S thereof. At this time, the non-inverting output terminal Q of the flip-flop FF outputs a high-level signal, and the inverting output terminal *Q thereof outputs a low-level signal.

The high-level signal outputted from the non-inverting output terminal Q of the flip-flop FF is inputted to the OR gate circuit OR1. At this time, the OR gate circuit OR outputs a high-level signal, irrelevant to the signal derived from the synchronous control circuit 13. The high-level signal outputted from the OR gate circuit OR1 is inputted to the drive −2 (11).

The drive −2 (11) for inputting thereinto the high-level signal supplies the drive power from the charge pump circuit 13 to the synchronous rectification transistor Tr2, so that the synchronous rectification transistor Tr2 is brought into the ON state.

The low-level signal outputted from the inverting output terminal *Q of the flip-flop FF is inputted to the AND gate circuit AND1. At this time, the AND gate circuit AND1 outputs a low-level signal, irrelevant to the signal derived from the PWM circuit 9. The low-level signal outputted from the AND gate circuit AND1 is inputted to the drive −1 (10).

The drive −1 (10) for inputting thereinto the low-level signal interrupts the supply of power to the main switching transistor Tr1, so that the switching transistor Tr1 is brought into the OFF state.

As previously explained, when the output voltage of the DC/DC converter is brought into the ovorvoltage state, the main switching transistor Tr1 is forcibly turned OFF, and at the same time, the synchronous rectification transistor Tr2 is forcibly turned ON.

As a consequence, the signal line 26, the synchronous rectification transistor Tr2, the signal line 2, the signal line 1, the choke coil L1, the signal line 15, the resistor R1, and the signal line 16 are connected to each other, so that the output voltage of the second DC/DC converter is clamped to the ground potential (OV) connected to the signal line 26.

Accordingly, it is possible to prevent the overvoltage from being applied to the load of the second DC/DC converter.

According to the DC/DC converter of this second embodiment, no longer the high withstanding voltage type smoothing organic capacitor is required as the capacitor C1. Moreover, the burn-out preventing fuse is not required, resulting in the reduction of a total number of constructive elements.

In addition, since the burn-out preventing fuse for the capacitor C1 is not required, the resistance value of the second DC/DC converter would be lowered, so that the converting efficiency of the DC/DC converter could be increased.

(3) IN A CASE THAT MAIN SWITCHING TRANSISTOR Tr1 IS SHORTCIRCUITED

When the main switching transistor Tr1 is shortcircuited, since the signal line 14 is connected to the signal line 1, there is a risk that the output voltage of the second DC/DC converter is brought into the overvoltage state.

When the output voltage becomes the overvoltage condition due to the shortcircuit failure of the main switching transistor Tr1, since the output voltage is increased higher than the reference voltage e3, the output comparator IC2 outputs a high-level signal.

As previously explained in the item (2), at this time, the control circuit CTL forcibly turns ON the synchronous rectification transistor Tr2, so that the output voltage of the DC/DC converter is clamped to the ground level. As a consequence, it is possible to present the overvoltage from being applied to the load of the DC/DC converter.

Furthermore, as indicated in the above-explained embodiment mode 1, if a fuse is provided at a half way of the signal line 14, then the voltage applied to the DC/DC converter is shortcircuited via this fuse, the signal line 14, the main switching transistor Tr1, the signal line 1, the signal line 2, and the synchronous rectification transistor Tr2. At this time, the fuse is melt down by this shortcircuit current.

As a result, the voltage applied to the DC/DC converter is interrupted within a very short time period, so that it is possible to prevent the overvoltage from being applied to this DC/DC converter at an earlier stage.

Accordingly, in accordance with the DC/DC converter of this embodiment mode, when the overvoltage condition happens to occur, the circuit of the second DC/DC converter and the load thereof can be firmly protected.

According to the DC/DC converter of this second embodiment, no longer the high withstanding voltage type organic capacitor is reguired as the smoothing capacitor C1. Moreover, the burn-out preventing fuse is not required, resulting in the reduction of a total number of constructive elements could.

In addition, since the burn-out preventing fuse for the smoothing capacitor C1 is not required, the resistance value of the second DC/DC converter would be lowered, so that the converting efficiency of the DC/DC converter could be increased.

(ANOTHER EMBODIMENT MODE OF SECOND DC/DC CONVERTER)

In the DC/DC converter. according to the embodiment mode 2, the voltage comparator IC2 and the power supply e3 are provided independent from the control circuit CTL. Alternatively, as represented in FIG. 7 and FIG. 8, the voltage comparator IC2 and the power supply e3 may be employed within the control circuit CTL.

Figure 7:
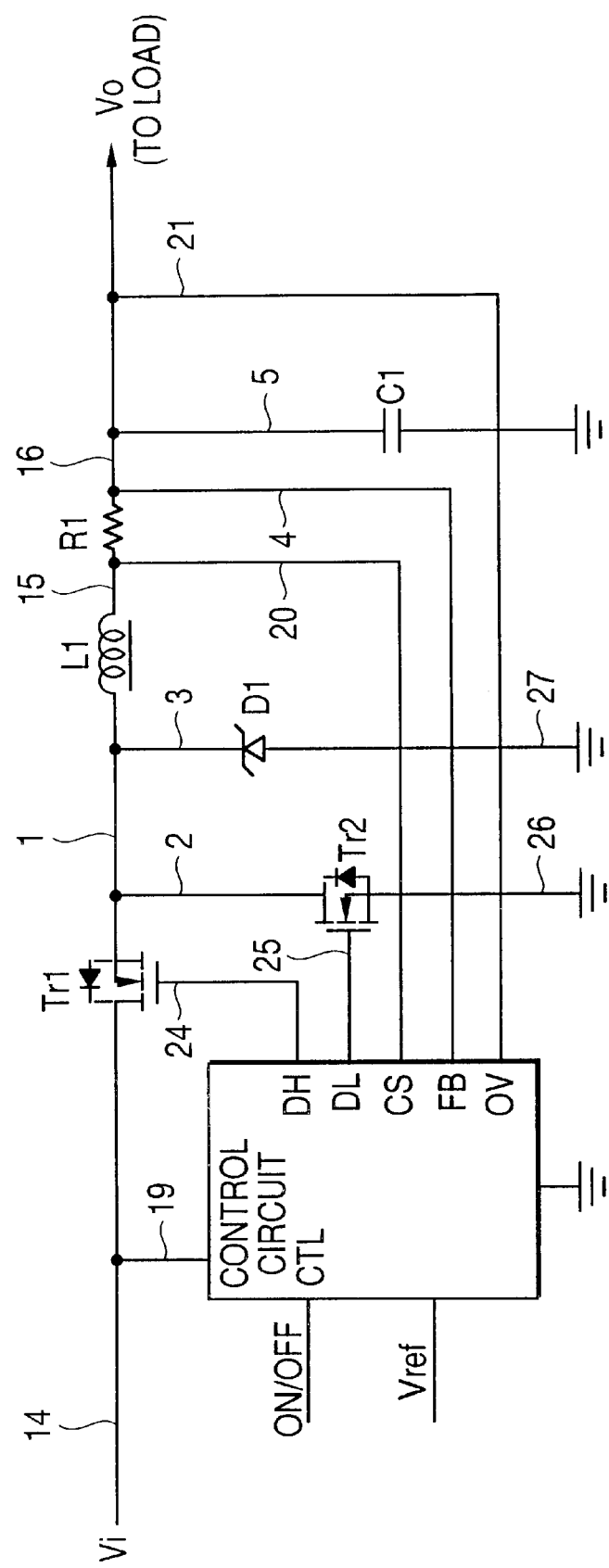
FIG. 7 schematically shows an arrangement of a DC/DC converter according to another embodiment mode of the present invention.
Figure 8:
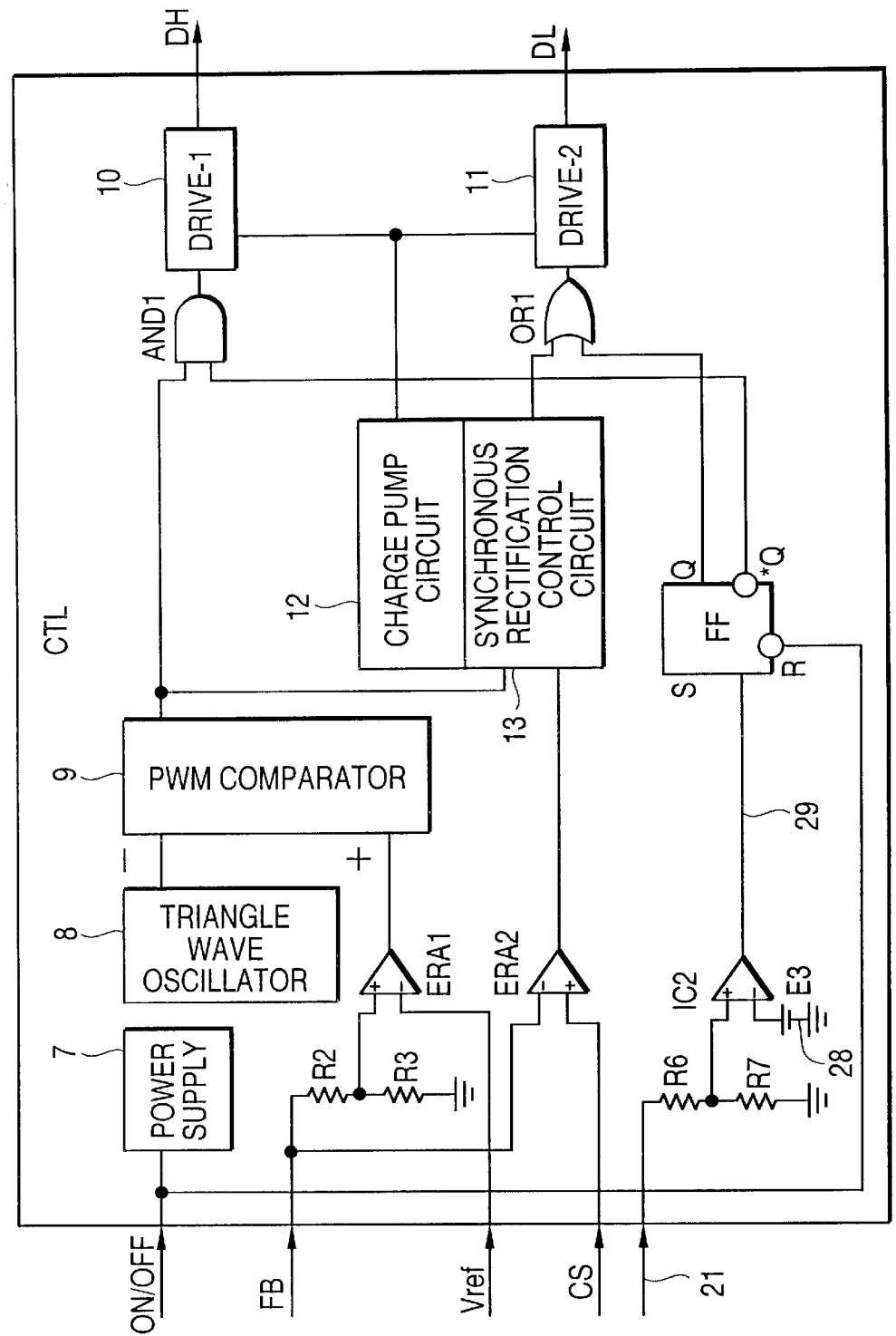
FIG. 8 represents an internal arrangement of a control circuit CTR corresponding to the DC/DC converter of FIG. 7.

In this case, as shown in FIG. 7, the signal line 21 is directly connected to the control circuit CTL. Further, as indicated in FIG. 8, the control circuit CTL is constructed of a dividing resistor R6/R7 connected to the signal line 21, the voltage comparator IC2 connected to this dividing resistor R6/R7, and the power supply e3 connected to this voltage comparator IC2.

The dividing resistor R6/R7 is a resistor for sensing the voltage inputted via the signal line 21. The voltage sensed by this dividing resistor R6/R7 is inputted to the non-inverting input terminal of the voltage comparator IC2.

The inverting input terminal of the voltage comparator IC2 is connected via a signal line 28 to the power supply e3.

Further, the output terminal of the voltage comparator IC2 is connected via a signal line 29 to the set terminal S of the flip-flop FF.

When the control circuit CTL is arranged in the above-described manner, if the voltage outputted from the cell DC/DC converter becomes the overvoltage, then the output voltage under overvoltage state is inputted to the dividing resistor R6/R7 of the control circuit CTL.

The dividing resistor R6/R7 senses the voltage value of this output voltage under overvoltage state. The voltage value sensed by this dividing resistor R6/R7 is inputted to the non-inverting input terminal of the voltage comparator IC2.

The voltage comparator IC2 subtracts the reference voltage e3 derived from the power supply e3 from the voltage value derived from the dividing resistor R6/R7. At this time, since the voltage value from the dividing resistor R6/R7 becomes higher than the reference voltage e3, the voltage comparator IC2 outputs a high-level signal.

As a result, the high-level signal outputted from the voltage comparator IC2 is inputted to the set terminal S of the flip-flop FF.

Accordingly, the control circuit CTL can perform a similar control operation to that of the above-described embodiment.

As described, even when both the voltage comparator IC2 and the power supply e3 are build in the control circuit CTL, it is possible to achieve an advantage similar to that of the above-explained embodiment mode 1.

EMBODIMENT MODE 3

Figure 9:
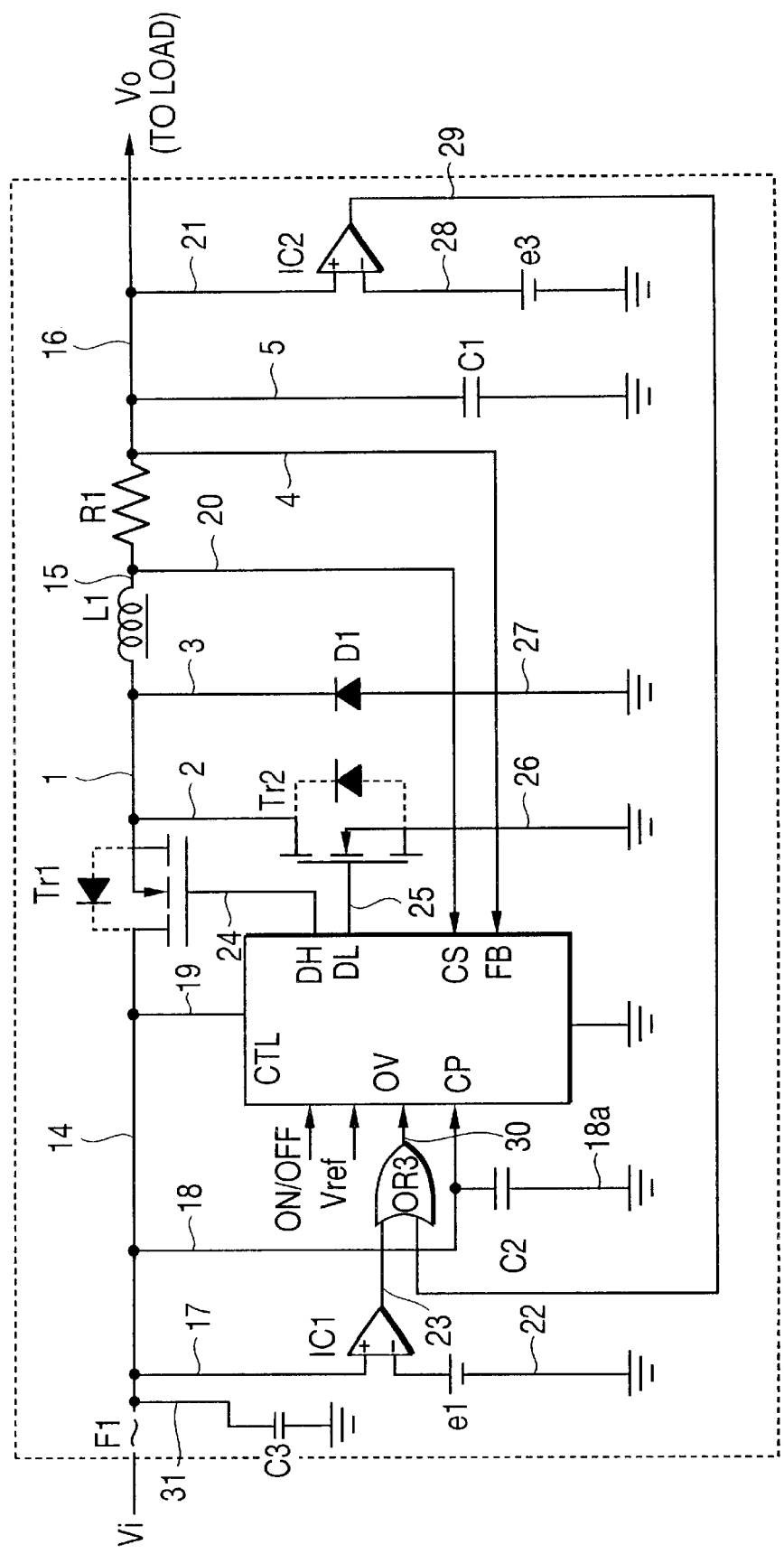
FIG. 9 schematically indicates an arrangement of a DC/DC converter according to an embodiment mode 3 of the present invention.

FIG. 9 is a schematic diagram for showing a DC-to-DC converter according to a third embodiment mode 3 of the present invention. It should be noted that the same reference numerals used in the above-described embodiment modes 1 and 2 will be employed as those for denoting the same or similar constructive elements in the following embodiment mode.

(ARRANGEMENT OF THIRD DC/DC CONVERTER)

The DC/DC converter is constructed of a fuse F1, a voltage comparator IC1, power supply e1, capacitor C3, capacitor C2, an OR gate circuit OR3, a control circuit CTL, a main switching transistor Tr1, a synchronous rectification transistor Tr2, a diode D1, a choke coil L1, a resistor R1a, capacitor C1, a voltage comparator IC2, and a power supply e3.

(CIRCUIT CONNECTIONS FOR THIRD DC/DC CONVERTER)

Now, connection modes of the above-described constructive elements will be described.

The fuse F1 is employed in a half way of a signal line 14 used to connect the cell with the main switching transistor Tr1.

The main switching transistor Tr1 connected via this signal line 14 to the cell is connected via another signal line 1 to the choke coil L1, and via another signal line 24 to the control circuit CTL.

The choke coil L1 connected via the signal line 1 with the main switching transistor Tr1 is further connected via the signal line 15 is to the resistor R1.

The resistor R1 connected via the signal line 15 to the choke coil L1 in connected via a signal line 16 to the load.

Four signal lines 31, 17, 18, 19 are connected to a half way of the signal line 14 for connecting the fuse F1 with the main switching transistor Tr1.

The signal line 31 located near the fuse F1 among the above-described four signal lines 31, 17, 18, 19 is connected via the capacitor C3 to the ground.

The signal line 17 among the above-described four signal lines 31, 17, 18, 19 is connected to the voltage comparator IC1. This voltage comparator IC1 owns, for example, a non-inverting input terminal, an inverting input terminal, and an output terminal. In this case, the signal line 17 is connected to the non-inverting input terminal of the voltage comparator IC1. The inverting input terminal of the voltage comparator IC1 is connected via another signal line 22 to the power supply e1. Furthermore, the output terminal of the voltage comparator IC1 is connected via a signal line 23 to the OR gate circuit OR3.

The signal line 18 among the above-explained four signal lines 31, 17, 18, 19 is connected to the control circuit CTL. A signal line 18a is connected to a half way of this signal line 18. This signal line 18a is connected via the capacitor C2 to the ground.

The signal line 19 located near the main switching transistor Tr1 among the four signal lines 31, 17, 18, 19 is connected to the control circuit CTL.

Two signal lines 2 and 3 are connected to a half way of the signal line 1 used to connect the main switching transistor Tr1 with the choke coil L1.

The signal line 2 located near the main switching transistor Tr1 among the two signal lines 2 and 3 is connected to the synchronous rectification transistor Tr2. This synchronous rectification transistor Tr2 is connected via the signal line 25 to the control circuit CTL, and via a signal line 26 to the ground.

The signal line 3 located near th e choke coil L1 among the two signal lines 2 and 3 is connected to the cathode terminal of the diode D1. The anode terminal of this diode D1 is connected via a signal line 27 to the ground.

Further, a single signal line 20 is connected to a half way of the signal line 15 for connecting the choke coil C1 to the resistor R1.

The signal line 20 is connected to the control circuit CTL, and is sudh a signal line for entering the voltage CS which is inputted to the resister R1 to the control circuit CTL.

Three signal lines 4, 5, 21 are connected to a half way of the signal line 16 for connecting the resgistor R1 and the load.

The signal line 4 located near the resistor R1 among the three signal lines 4, 5, 21 is connected to the control circuit CTL. This signal line 4 is a signal line for feeding back the voltage value FB outputted from the DC/DC converter to the control circuit CTL.

A central signal line 5 among the three signal lines 4, 5, 21 is connected via the smoothing capacitor C1 to the ground.

The signal line 21 located near the load among the three signal lines 4, 5, 21 is connected to the voltage comparator IC2. This voltage comparator IC2 is, for instance, a voltage comparator having a non-inverting input terminal, an inverting input terminal, and an output terminal. In this case, the signal line 21 is connected to the non-inverting input terminal of the voltage comparator IC2. The inverting input terminal of the voltage comparator IC2 is connected via the signal line 28 to the power supply e3. Furthermore, the output terminal of the voltage comparator IC2 is connected via the signal line 29 to the OR gate circuit OR3.

In addition, as described above, the OR gate circuit OR3 is connected via the voltage comparator IC1 and the signal line 23, and at the same time, via the voltage comparator IC2 and the signal line 29. This OR gate circuit OR3 is such a circuit having two input terminals and one output terminal. In this case, the signal line 23 and the signal line 29 are connected to the above two input terminals. The output terminal of the OR gate circuit OR3 is connected via the signal line 30 to the control circuit CTL.

Also, as explained before, the signal lines 30, 18, 19, 24, 25, 20, 4 are connected to the control circuit CTL, and at the same time, either an ON instruction value or an OFF instruction value, and a target voltage $V_{ref}$ are externally inputted thereto.

(CIRCUIT FUNCTIONS OF THIRD DC/DC CONVERTER)

Then, functions of the above-described respective constructive elements will now be explained. It should be understood that explanations about the same constructive elements as those of the embodiment modes 1 and 2 are omitted.

(OR GATE CIRCUIT OR3)

The OR gate circuit OR3 inputs thereinto the signal outputted from the voltage comparator IC1 and the voltage outputted from the voltage comparator IC2. Then, the OR gate circuit OR3 outputs a high-level signal for indicating that the overvoltage condition happens to occur when the high-level signal derived from at least one of the voltage comparator IC1 and the voltage comparator IC2 is inputted thereinto, namely, when the input voltage of the DC/DC converter is higher than the reference voltage e1, or the output voltage of the DC/DC converter is higher than the reference voltage e3.

Also, the OR gate circuit OR3 outputs a low-level signal when the low-level signals derived from both the voltage comparator IC1 and the voltage comparator IC2 are inputted thereinto, namely, when the input voltage of the DC/DC converter is lower than, or equal to the reference voltage e1, and also the output voltage of the DC/DC converter is lower than, or equal to the reference voltage e3.

(OPERATION/EFFECTS OF EMBODIMENT MODE 3)

A description will now be made of operation/effects of the third DC/DC converter according to the third embodiment of the present invention.

(1) IN A CASE THAT THIRD DC/DC CONVERTER IS OPERABLE UNDER NORMAL CONDITION

In a case that the third DC/DC converter is normally operated, namely when the input voltage to the DC/DC converter is lower than, or equal to the reference voltage e1, and further, the output voltage from the DC/DC converter is lower than, or equal to the reference voltage e3, the voltage comparator IC1 and the voltage comparator IC2 output low-level signals.

The low-level signals outputted from the voltage comparator IC1 and the voltage comparator IC2 are inputted to the OR gate circuit OR3. In this case, the OR gate circuit OR3 outputs a low-level signal.

The low-level signal outputted from the OR gate circuit OR3 is inputted to the set terminal S of the flip-flop FF of the control circuit CTL. Then, the flip-flop FF stores the inputted low-level signal. At this time, the output terminal Q of the flip-flop FF outputs the low-level signal stored in the flip-flop FF.

The low-level signal outputted from the output terminal Q of the flip-flop FF is inputted to the OR gate circuit OR1 and the OR gate circuit OR2.

The OR gate circuit OR1 directly outputs the signal (low-level signal or high-level signal) derived from the synchronous rectification control circuit 13. The signal outputted from the OR gate circuit OR1 is inputted to the drive −2 (11).

The drive −2 (11) turns ON/OFF the synchronous rectification transistor Tr2 in response to the signal from the OR gate circuit OR1, namely the signal from the synchronous rectification control circuit 13. As a result, the drive −2 (11) can turn ON the synchronous rectification transistor Tr2 during a time period while the main switching transistor Tr1 is under OFF state, and the diode D1 discharges the energy stored in the choke coil L1 to the output side.

The OR gate circuit OR2 into which the low-level signal from the flip-flop FF is inputted directly outputs the signal (low-level signal, or high-level signal) derived from the PWM comparator 9. The signal outputted from this OR gate circuit OR2 is entered into the drive −1 (10).

The drive −1 (10) turns ON/OFF the main switching transistor Tr1 in response to the signal derived from the OR gate circuit OR2, namely the signal from the PWM comparator 9. As a result, the drive −1 (10) turns ON the main switching transistor Tr1 when the triangle wave from the triangle wave oscillator 8 is higher than the voltage value derived from the error amplifier ERA1, whereas the drive −1 (10) turned OFF the main switching transistor Tr1 when the triangle wave from the triangle oscillator 8 is lower than the voltage value derived from the error amplifier ERA 1.

(2) IN A CASE THAT INPUT VOLTAGE TO THIRD DC/DC CONVERTER IS UNDER OVERVOLTAGE CONDITION

In such a case that a voltage inputted to the third DC/DC converter becomes an overvoltage, since the input voltage is higher than the reference voltage e1, the signal derived from the voltage comparator IC1 is a signal indicative of a high level. The high-level signal outputted from the voltage comparator IC1 is inputted to the OR gate circuit OR3.

On the other hand, since the output voltage of the DC/DC converter is lower than the reference voltage e3, a signal outputted from the voltage comparator IC2 becomes a low-level signal. This low-level signal outputted from the voltage comparator IC2 is inputted into the OR gate circuit OR3.

As described above, the OR gate circuit OR3 inputs thereinto the high-level signal from the voltage comparator IC1 and the low-level signal from the voltage comparator IC2. At this time, a OV outputted from the OR gate circuit OR3 becomes a high-level signal. The high-level signal outputted from the OR gate OR3 is inputted into the flip-flop FF of the control circuit CTL.

The flip-flop FF into which the high-level signal derived from the OR gate circuit OR3 is entered stores the inputted high-level signal. Then, the output terminal Q of the flip-flop PF outputs the high-level signal stored in the flip-flop FF.

The high-level signal outputted from the output terminal Q of the flip-flop FF is entered into the OR gate circuit OR1 and the OR gate circuit OR2.

The OR gate circuit OR1 into which the high-level signal outputted from the output terminal Q of the flip-flop FF is inputted outputs a high-level signal, irrelevant to the signal from the synchronous rectification control circuit 13. The drive −2 (11) for inputting thereinto the high-level signal derived from the OR gate circuit OR1 supplies the power from the charge pump circuit 12 to the synchronous rectification transistor Tr2. At this time, the synchronous rectification transistor Tr2 in turned ON to thereby connect between the signal line 2 and the signal line 26.

Also, the OR gate circuit OR2 into which the high-level signal derived from the flip-flop FF is entered outputs a high-level signal, irrelevant to the signal from the PWM comparator 9.

The high-level signal outputted from the OR gate OR2 is inputted into the drive −1 (10).

The drive −1 (10) into which the high-level signal from the OR gate circuit OR2 is inputted supplies the power from the charge pump circuit 12 to the main switching transistor Tr1. At this time, the main switching transistor Tr1 is brought into the ON state to thereby connect between the signal line 14 and the signal line 1.

As a result, the voltage inputted to the DC/DC converter is applied via the fuse F1, the signal line 14, the main switching transistor Tr1, the signal line 1, the signal line 2, the synchronous rectification transistor Tr2, and the signal line 26 to the ground. At this time, an overcurrent will flow through the fuse F1, so that this fuse F1 is melted down.

As a result, since the fuse F1 is melted down, it is possible to prevent the constructive elements of the third DC/DC converter, especially the capacitor C3 provided in the input unit of this DC/DC converter from being applied by th excessive high voltages. Therefore, it is possible to avoid that the capacitor C3 would be burned out.

According to the DC/DC converter of this third embodiment, no longer the high withstanding voltage type organic capacitor is required as the capacitor C3. Moreover, the burn-out preventing fuse is not required, resulting in the reduction of a total number of constructive elements.

In addition, since the burn-out preventing fuse for the capacitor C3 is not required, the resistnce value of the third DC/DC converter would be lowered, so that the converting efficiency of the DC/DC converter could be increased.

(3) IN A CASE THAT OUTPUT VOLTAGE FROM THIRD DC/DC CONVERTER IS UNDER OVERVOLTAGE CONDITION

In such a case that a voltage outputted from the third DC/DC converter becomes an overvoltage, since the output voltage is higher than the reference voltage e3, the signal derived from the voltage comparator IC2 is a signal indicative of a high level. The high-level signal outputted from the voltage comparator IC2 is inputted via a signal line 29 to the OR gate circuit OR3.

On the other hand, since the input voltage of the DC/DC converter is lower than the reference voltage e1, a signal outputted from the voltage comparator IC1 becomes a low-level signal. This low-level signal outputted from the voltage comparator IC1 is inputted via a signal line 23 into the OR gate circuit OR3.

The OR gate circuit OR3 for inputting thereinto the low-level signal from the voltage comparator IC1 and the high-level signal from the voltage comparator IC3 will output a high-level signal. The high-level signal outputted from this OR gate circuit OR3 is inputted into the control circuit CTL.

As previously described in item (1), the control circuit CTL forcibly turns ON the main switching transistor Tr1 and the synchronous rectification transistor Tr2. Thus, the input voltage to the third DC/DC converter is conducted through the fuse F1, the signal line 14, the main switching transistor Tr1, the signal line 1, the signal line 2, the synchronous rectification transistor Tr2, and the signal line 26 to the ground. At this time, an overcurrent will flow through the fuse F1, so that this fuse F1 is melted down.

As a result, the voltage inputted to the third DC/DC converter is interrupted, it is possible to prevent the overvoltage from being applied to the load of this DC/DC converter.

Therefore, according to the third DC/DC converter, when the output voltage of this DC/DC converter is brought into the overvoltage state, the circuit of this DC/DC converter and the load can be surely protected.

According to the DC/DC converter of this third embodiment, no longer the high withstanding voltage type organic capacitor is required as the smoothing capacitor C1. Moreover, the burn-out preventing fuse is not required, resulting in the reduction of a total number of constructive elements.

In addition, since the burn-out preventing fuse for the smoothing capacitor C1 is not required, the resistance value of the third DC/DC converter would be lowered, so that the converting efficiency of the DC/DC converter could be increased.

EMBODIMENT MODE 4

Figure 10:
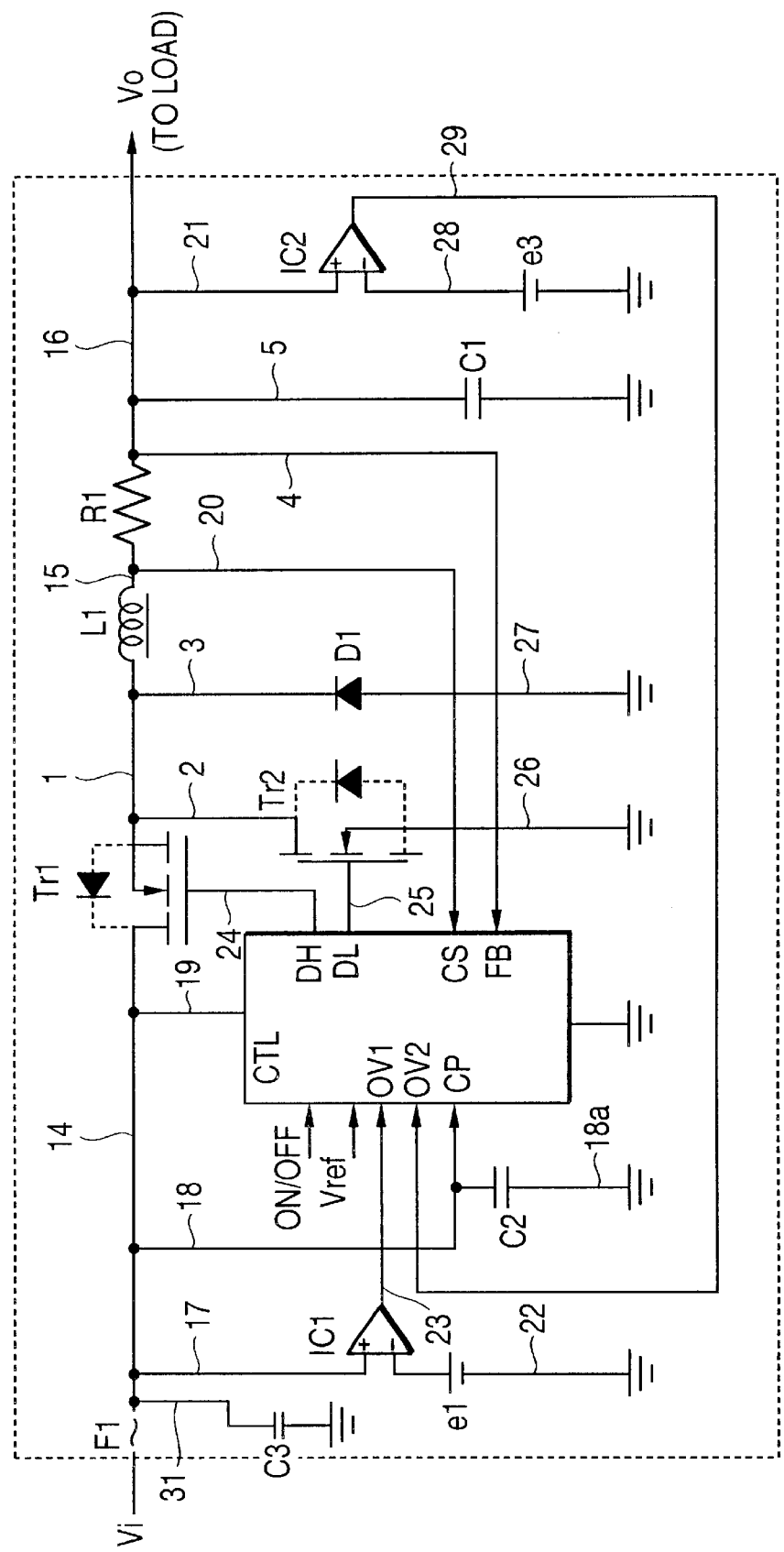
FIG. 10 schematically indicates an arrangement of a DC/DC converter according to a embodiment mode 4 of the present invention.

FIG. 10 is a schematic diagram for showing a DC-to-DC converter according to a fourth embodiment mode 4 of the present invention. It should be noted that the same reference numerals used in the embodiment modes 1 to 3 will be employed as those for denoting the same or similar constructive elements in the following embodiment mode.

(ARRANGEMENT OF FOURTH DC/DC CONVERTER)

The DC/DC converter according to this embodiment mode 4 is constructed of a fuse F1, a voltage comparator IC1, a power supply e1, a capacitor C3, a capacitor C2, a control circuit CTL, a main switching transistor Tr1, a synchronous rectification transistor Tr2, a diode D1, a choke coil L1, a resistor R1, a capacitor C1, a voltage comparator IC2, and a power supply e3.

(CIRCUIT CONNECTIONS FOR FOURTH DC/DC CONVERTER)

Now, connection modes of the above-described constructive elements will be described. It should be understood that only different connection mode from the above-explained connection mode 3 will now be explained.

An output terminal of the voltage comparator IC1 is directly connected via a signal line 23 to the control circuit CTL. In this case, a OV1 outputted from the voltage comparator IC1 is inputted via the signal line 23 to the control circuit CTL.

An output terminal of the voltage comparator IC2 is directly connected via a signal line 29 to the control circuit CTL. In this case, a OV2 outputted from the voltage comparator IC2 is inputted via the signal line 29 to the control circuit CTL. Other connection modes are identical with that of the above described embodiment mode 3.

(CIRCUIT FUNCTIONS OF FOURTH DC/DC CONVERTER)

Then, functions of the above-described respective constructive elements will now be explained. It should be understood that explanations about the same constructive elements as those of the embodiment mode 3 are omitted.

(CONTROL CIRCUIT CTL)

The control circuit CTL is connected via the signal line 23 to the output terminal of the voltage comparator IC1, and then inputs thereinto the OV1 outputted from the voltage comparator IC1.

The control circuit CTL is connected via the signal line 29 to the output terminal of the voltage comparator IC2, and then inputs thereinto the OV2 outputted from the voltage comparator IC2.

In this case, when such a signal (high-level signal) for indicating that the input voltage to the fourth DC/DC converter is under overvoltage state is inputted as the OV1 derived from the voltage comparator IC1, the control circuit CTL forcibly turns ON the main switching transistor Tr1 and the synchronous rectification transistor Tr2, so that the fuse F1 is melted down.

Also, when such a signal (high-level signal) for indicating that the output voltage from the fourth DC/DC converter is under overvoltage state is inputted as the OV2 derived from the voltage comparator IC2, the control circuit CTL forcibly turns OFF the main switching transistor Tr1 and, at the same time, forcibly turns ON the synchronous rectification transistor Tr2, so that the output voltage from this DC/DC converter is clamped to the ground level.

An internal circuit arrangement of the control circuit CTL for realizing the above-described functions will be explained.

(ARRANGEMENT OF CONTROL CIRCUIT CTL)

Figure 11:
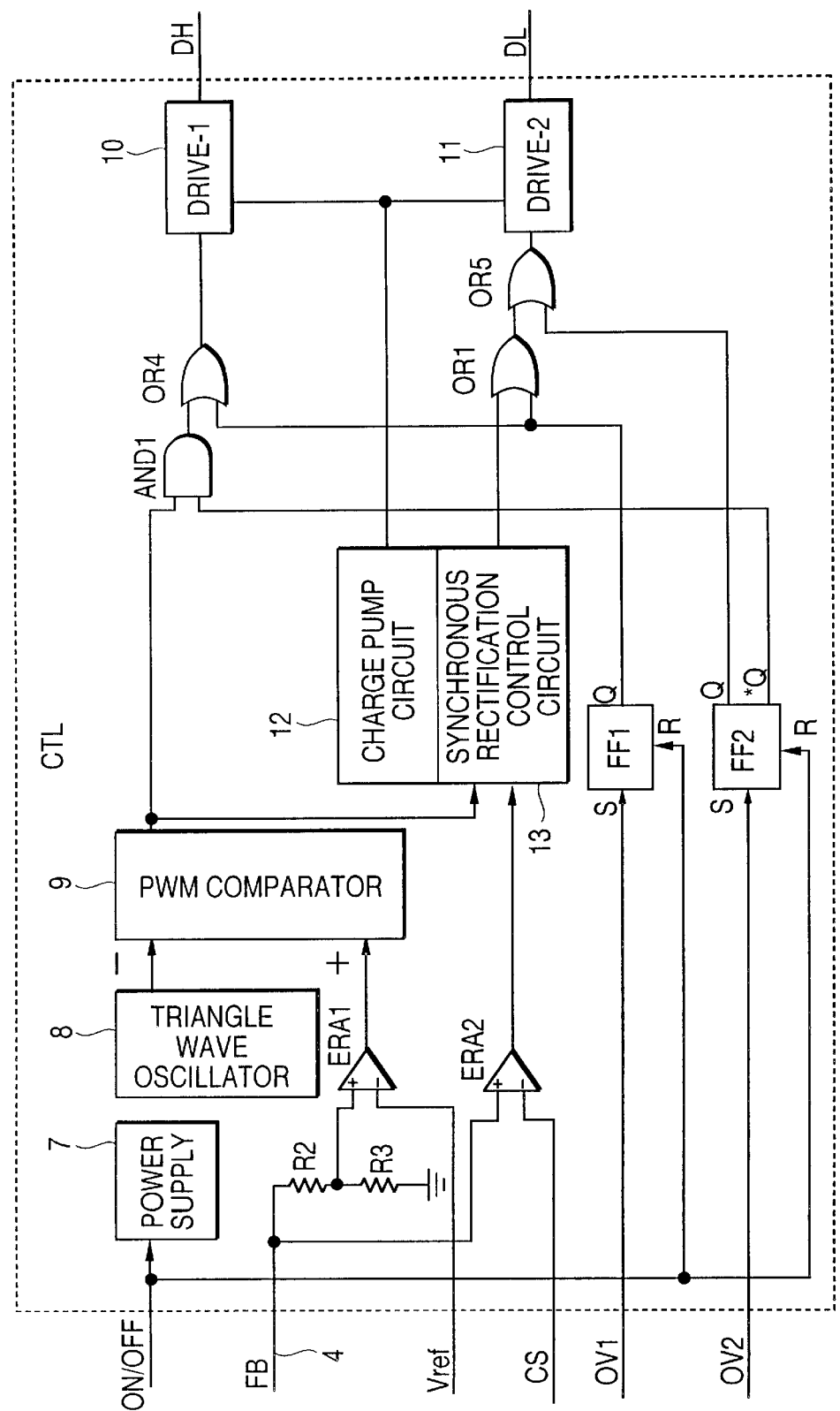
FIG. 11 represents an intel arrangement of a control circuit CTL of the embodiment mode 4.

As indicated in FIG. 11, the control circuit CTL is constructed of a power supply 7, a triangle wave oscillator 8, a PMW comparator 9, a charge pump circuit 12, a synchronous rectification control circuit 13, a flip-flop FF1 a flip-flop FF2, a drive −1 (10), and another drive −2 (11). The control circuit CTL further includes a dividing resistor R2/R3, error amplifiers ERA1 and ERA2, an AND gate circuit AND1, an OR gate circuit OR1, another OR gate circuit OR4, and another OR gate circuit OR5.

(FLIP-FLOP FF1)

The flip-flop FF1 owns two input terminals as a set terminal S and a reset terminal R, and an output terminals Q. The set terminal S of the flip-flop FF1 inputs thereinto the OV1 outputted from the voltage comparator IC1. When the OV1 is inputted to this set terminal S, the flip-flop FF1 stores therein the signal OV1 entered into the set terminal S.

The reset terminal R of the flip-flop FF1 inputs thereinto either the externally ON instruction value or OFF instruction value. The content stored in the flip-flop FF1 is reset, and a low-level signal is stored when either the ON instruction value or the OFF instruction value is inputted to this reset terminal R.

Furthermore, the output terminal Q of the flip-flop FF1 is connected to the OR gate circuit OR1 and the OR gate circuit OR4. This output terminal Q outputs the signal stored in the flip-flop FF1.

For example, when the input voltage of the DC/DC converter is lower than, or equal to the reference voltage e1, the set terminal S of the flip-flop FF1 inputs thereinto a low-level signal as the OV1 derived from the voltage comparator IC1. In this case, the flip-flop FF1 stores therein the low-level signal inputted to the set terminal S. Then the output terminal Q thereof outputs the low-level signal stored in this flip-flop FF1.

Also, when the input voltage of the DC/DC converter exceeds the reference voltage e1 (when input voltage becomes overvoltage), the set terminal S of the flip-flop FF1 inputs a high-level signal as the OV1 derived from the voltage comparator IC1. In this case, the flip-flop FF1 stores therein the high-level signal inputted to the set terminal S, and the output terminal Q thereof outputs the high-level signal stored in this flip-flop FF1.

(FLIP-FLOP FF2)

The flip-flop FF2 owns two input terminals as a set terminal and a reset terminal, and two output terminals as a non-inverting output terminal Q and an inverting output terminal *Q. The set terminal S of the flip-flop FF2 inputs thereinto the OV2 outputted from the voltage comparator IC2.

The reset terminal R of the flip-flop PF2 inputs thereinto either the externally ON instruction value or OFF instruction value. The signal stored in the flip-flop FF is reset to a low-level signal when either the ON instruction value or the OFF instruction value is inputted to the reset terminal.

Furthermore, the non-inverting output terminal Q of the flip-flop FF2 is connected to the OR gate circuit OR5. This output terminal Q directly outputs the signal stored in the flip-flop FF2.

For example, when the output voltage of the D/DC converter is lower than, or equal to the reference voltage e3, the set terminal S of the flip-flop FF2 inputs thereinto a low-level signal as the OV2 derived from the voltage comparator IC2. In this case, the flip-flop FF2 stores therein the low-level signal inputted to the set terminal S, and the non-inverting output terminal Q thereof outputs the low-level signal stored in this flip-flop FF2.

Also, when the output voltage of the DC/DC converter exceeds the reference voltage e3 (when output voltage becomes overvoltage), the set terminal S of the flip-flop FF2 inputs a high-level signal as the OV2 derived from the voltage comparator IC2. In this case, the flip-flop FF2 stores therein the high-level signal inputted to the set terminal S, and the non-inverting output terminal Q thereof outputs the high-level signal stored in this flip-flop FF2.

The inverting output terminal Q of the flip-flop FF2 is connected to the AND gate circuit AND1. This inverting output terminal *Q outputs a value produced by inverting the signal value stored in the flip-flop FF2, namely signals whose high level and low level are inverted are outputted.

For instance, the inverting output terminal *Q outputs a high-level signal when the OV2 stored in the flip-flop FF2 is the low-level signal (output voltage of DC/DC converter is lower than, or equal to reference voltage e3). Also, the inverting output terminal *Q outputs a low-level signal when the OV2 stored in the flip-flop FF2 is a high-level signal (if the output voltage of the DC/DC converter exceeds the refer voltage e3).

(AND GATE CIRCUIT AND1)

The AND gate circuit AND1 inputs thereinto the signal outputted from the PWM comparator 9 and the signal outputted from the inverting output terminal *Q of the flip-flop FF2. This AND gate circuit AND1 AND-gates the signal derived from the PW comparator 9 and the signal from the flip-flop PF2 to thereby output a signal indicative of this calculation result. The signal outputted from the AND gate circuit AND1 is entered to the OR gate circuit OR4.

For instance, when the output voltage from the DC/DC converter is lower than, or equal to the reference voltage e3, the AND gate circuit AND1 inputs the signal from the PWM comparator 9, and a high-level signal from the inverting output terminal *Q of the flip-flop FF2. In this case, the AND gate circuit AND1 directly outputs the signal from the PWM comparator 9.

Also, when the output voltage from the DC/DC converter is higher than the reference voltage e3, the AND gate circuit AND1 inputs the signal from the PWM comparator 9, and a low-level signal from the inverting output terminal *Q of the flip-flop FF2. In this case, the AND gate circuit AND1 outputs a low-level signal, irrelevant to the signal from the PWM comparator 9.

(OR GATE CIRCUIT OR4)

The OR gate circuit OR4 inputs thereinto the signal outputted from the AND gate circuit AND1 and the signal outputted from the output terminal Q of the flip-flop FF1. The OR gate circuit OR4 OR-gates the signal outputted from the AND gate circuit AND1 and the signal outputted from the output terminal Q of the flip-flop FF1, and outputs a signal indicative of this calculation result. The signal outputted from this OR gate circuit OR4 is inputted to the drive −1 (10).

For instance, when the input voltage of the DC/DC converter is lower than, or equal to the reference voltage e1, and also the output voltage thereof is lower than, or equal to the reference voltage e3, the OR gate circuit OR4 inputs thereinto the signal (same as that of PWM comparator 9) from the AND gate circuit AND1, and the low-level signal from the output terminal Q of the flip-flop FF1. In this case, the OR gate circuit 0R4 directly outputs the signal derived from the AND gate circuit AND1, namely from the PWM comparator 9.

Also, when the input voltage of the DC/DC converter is higher than the reference voltage e1, and the output voltage thereof is lower than, or equal to the reference voltage e3, the OR gate circuit OR4 inputs thereinto the signal (equal to the signal derived from the PWM comparator 9) from the AND gate circuit AND1, and the high-level signal from the output terminal Q of the flip-flop FF1. In this case, the OR gate circuit OR4 outputs a high-level signal, irrelevant to the signal derived from the AND gate circuit AND1.

When the input voltage of the DC/DC converter is lower than, or equal to the reference voltage e1, and also the output voltage thereof is higher than the reference voltage e3, the OR gate circuit OR4 inputs thereinto the low-level signal from the AND gate circuit AND1 and the low-level signal from the flip-flop FF1. In this case, the OR gate circuit OR4 outputs the low-level signal.

(OR GATE CIRCUIT OR1)

The OR gate circuit OR1 inputs thereinto the signal outputted from the synchronous rectification control circuit 13 and the signal outputted from the output terminal Q of the flip-flop FF1. The OR gate circuit OR1 OR-gates the signal outputted from the synchronous rectification control circuit 13 and the signal outputted from the flip-flop FF1, and outputs a signal indicative of this calculation result. The signal outputted from this OR gate circuit OR1 is inputted to the OR gate circuit OR5.

For instance, when the input voltage of the DC/DC converter is lower than, or equal to the reference voltage e1, the OR gate circuit OR1 inputs thereinto the signal from the synchronous rectification control circuit 13, and the low-level signal from the output terminal of the flip-flop FF1. In this case, the OR gate circuit OR1 directly outputs the signal derived from the synchronous rectification control circuit 13.

Also, when the input voltage of the DC/DC converter is higher than the reference voltage e1, the OR gate circuit OR1 inputs thereinto the signal from the synchronous rectification control circuit 13, and the high-level signal from the output terminal Q of the flip-flop FF1. In this case, the OR gate circuit OR1 outputs a high-level signal, irrelevant to the signal from the synchronous rectification control circuit 13.

(OR GATE CIRCUIT OR5)

The OR gate circuit OR5 inputs thereinto the signal outputted from the OR gate circuit OR1 and the signal outputted from the output terminal Q of the flip-flop FF2. The OR gate circuit OR5 OR-gates the signal outputted from the circuit OR1 and the signal outputted from the flip-flop FF2, and outputs a signal indicative of this calculation result. The signal outputted from this OR gate circuit OR5 is inputted to the drive −2 (11).

For instance, when the input voltage of the DC/DC converter is lower than, or equal to the reference voltage e1, and also the output voltage is lower than, or equal to the reference voltage e3, the OR gate circuit OR5 inputs thereinto tho high-level signal from the OR gate circuit OR1, and the low-level signal from the output terminal Q of the flip-flop FF2. In this case, the OR gate circuit OR5 outputs a high-level signal.

Also, when the input voltage of the DC/DC converter is higher than the reference voltage e1, and also the output voltage is lower than, or equal to the reference voltage e3, the OR gate circuit OR5 inputs thereinto the high-level signal from the OR gate circuit OR1 and the low-level signal from the output terminal Q of the flip-flop FF2. In this case, the OR gate circuit OR5 outputs a high-level signal.

When the input voltage of the DC/DC converter is lower than, or equal to the reference voltage e1, and the output voltage is higher than the reference voltage e3, the OR gate circuit OR5 inputs thereinto the signal (equal to the signal outputted from the synchronous rectification circuit 13) from the OR gate circuit OR1, and the high-level signal from the flip-flop FF2. In this case, the OR gate circuit OR5 outputs a high-level signal, irrelevant to the signal from the OR gate circuit OR1.

(DRIVE −1 (10))

In response to the signal from the OR gate circuit OR4, the drive −1 (10) turns ON/OFF the main switching transistor Tr1.

For example, when the high-level signal from the OR gate circuit OR4 is inputted, the drive −1 (10) supplies the power supplied from the charge pump circuit 12 to the main switching transistor Tr1, so that the main switching transistor Tr1 is brought into the ON state.

Also, when the low-level signal from the AND gate circuit AND1 is inputted, the drive −1 (10) interrupts the supply of power to the main switching transistor Tr1, so that this main switching transistor Tr1 is brought into the OFF state.

(OPERATION/EFFECTS OF EMBODIMENT MODE 4)

A description will now be made of operation/effects of the fourth DC/DC converter according to the fourth embodiment of the present invention.

(1) IN A CASE THAT FOURTH DC/DC CONVERTER IS OPERABLE UNDER NORMAL CONDITION

In a case that the fourth DC/DC converter is normally operated, namely when the input voltage of the DC/DC converter is lower than, or equal to the reference voltage e1, and further the output voltage from the DC/DC converter is lower than, or equal to the reference voltage e3, the voltage comparator IC1 and the voltage comparator IC2 output low-level signals.

The low-level signal outputted from the voltage comparator IC1 is inputted to the set terminal S of the flip-flop FF1 of the control circuit CTL. Also, the low-level signal outputted from the voltage comparator IC2 is inputted to the set terminal S of the flip-flop FF2 of the control circuit CT1.

The flip-flop FF1 into which the low-level signal from the voltage comparator IC1 is inputted stores therein the inputted low-level signal. Then, the output terminal Q of the flip-flop FF1 outputs a low-level signal. The low-level signal outputted from the output terminal Q of the flip-flop FF1 is inputted to the OR gate circuit OR4 and the OR gate circuit OR1.

Also, the flip-flop FF2 into which the low-level signal from the voltage comparator IC2 is inputted stores therein the inputted low-level signal. Then, the output terminal Q of the flip-flop FF2 outputs a low-level signal, and the output terminal *Q thereof outputs a high-level signal. The low-level signal outputted from the output terminal Q of the flip-flop FF2 is inputted to the OR gate circuit OR5, and the high-level signal outputted from the output terminal *Q is inputted to the AND gate circuit AND1.

The AND gate circuit AND1 inputs thereinto the high-level signal from the output terminal *Q of the flip-flop FF2, and also Inputs thereinto the signal from the PWM comparator 9. At this time, the AND gate circuit AND1 directly outputs the signal derived from the PWM comparator 9. The signal outputted from the AND gate circuit AND1 is inputted to the OR gate circuit OR4

As previously explained, the OR gate circuit OR4 inputs thereinto the low-lovel signal from the output terminal Q of the flip-flop FF1, and the signal (equal to the signal from the PWM comparator 9) from the AND gate circuit AND1. In this case, the OR gate circuit OR4 directly outputs the signal derived from the AND gate circuit AND1, namely the signal from the PWM comparator 9.

The signal (equal to the signal from the PWM comparator 9) outputted from the OR gate circuit OR4 is inputted into the drive −1 (10). As a result, the drive −1 (10) can turn ON/OFF the main switching transistor Tr1 in response to the signal from the PWM comparator 9.

The OR gate circuit OR1 into which the low-level signal from the output terminal Q of the flip-flop FF1 is entered also inputs thereinto the signal derived from the synchronous rectification control circuit 13. In this case, the OR gate circuit OR1 directly outputs the signal derived from the synchronous rectification control circuit 13. The signal (equal to the signal from the synchronous rectification control circuit 13) outputted from the OR gate circuit OR1 is inputted to the OR gate circuit OR5.

As previously described, the OR sate circuit OR5 inputs thereinto the signal from the OR gate circuit OR1 (equal to the signal outputted from the synchronous rectification control circuit 13) and the low-level signal from the output terminal Q of the flip-flop FF2. At this time, the OR gate circuit OR5 outputs the signal from the OR gate circuit OR1, namely the signal identical to the signal outputted from the synchronous rectification control circuit 13. The signal outputted from the OR gate circuit OR5 (equal to the signal outputted from the synchronous rectification control circuit 13) is inputted into the drive 2–(11). As a result, the drive 2–(11) can turn ON/OFF the synchronous rectification transistor Tr2 in response to the signal from the synchronous rectification control circuit 13.

(2) IN A CASE THAT INPUT VOLTAGE TO FOURTH DC/DC CONVERTER IS UNDER OVERVOLTAGE STATE

When the voltage inputted into the DC/DC converter is brought into the overvoltage state, the voltage comparator IC1 outputs a high-level signal. Since the output voltage of the DC/DC converter is lower than, or equal to the reference voltage e3, the voltage comparator 1C2 outputs a low-level signal.

The high-level signal outputted from the voltage comparator IC1 is inputted to the set terminal S of the flip-flop FF1 of the control circuit CTL. Also, the low-level signal outputted from the voltage comparator IC2 is inputted to the set terminal S of the flip-flop FF2 of the control circuit CTL.

The flip-flop FF1 into which the high level signal from the voltage comparator IC1 is inputted stores therein the inputted high-level signal. Then, the output terminal Q of the flip-flop FF1 outputs a high level signal. The high-level signal outputted from the output terminal Q of the flip-flop FF1 is inputted to the OR gate circuit OR4 and the OR gate circuit OR1.

Also, the flip-flop FF2 into which the low-level signal from the voltage comparator IC2 is inputted stores therein the inputted low-level signal. Then, the output terminal Q of the flip-flop FF2 outputs a low-level signal, and the output terminal *Q thereof outputs a high-level signal. The low-level signal outputted from the output terminal Q of the flip-flop FF2 is inputted to the OR gate circuit OR5, and the high-level signal outputted from the output terminal *Q is inputted to the AND gate circuit AND1.

The AND gate circuit AND1 inputs thereinto the high-level signal from the output terminal *Q of the flip-flop FF2, and also inputs thereinto the signal from the PWM comparator 9. At this time, the AND gate circuit AND1 directly outputs the signal derived from the PWM comparator 9. The signal outputted from the AND gate circuit AND1 (equal to the signal from the PWM comparator 9) is inputted to the OR gate circuit OR4.

As previously explained, the OR gate circuit OR4 inputs thereinto the signal (equal to the signal from the PWM comparator 9) from the AND gate circuit AND1, and the high-level signal from the output terminal Q of the flip-flop FF1. In this case, the OR gate circuit OR4 directly outputs a high-level signal, irrelevant to the signal derived from the AND gate circuit AND1 (equal to the signal outputted from the PWM comparator 9). As a result, the drive −1 (10) turns ON the main switching transistor Tr1, irrelevant to the signal outputted from the PWM comparator 9.

Also, the OR ate circuit OR1 inputs thereinto the high-level signal from the output terminal Q of the flip-flop FF1, and also inputs the signal from the synchronous rectification control circuit 13. In this case, the OR gate circuit OR1 outputs a high-level signal, irrelevant to the signal from the synchronous rectification control circuit 13. This high-level signal outputted from the OR gate circuit OR1 is inputted to the OR gate circuit OR5.

As explained above, the OR gate circuit OR5 inputs thereinto the low-level signal from the output terminal Q of the flip-flop FF2 and the high-level signal from the OR gate circuit OR1. At this time, the OR gate circuit OR5 outputs a high-level signal. As a result, the drive 2–(11) turns ON the synchronous rectification transistor Tr2, irrelevant to the signal derived from the synchronous rectification control circuit 13.

Thus, when the injut voltage to the fourth DC/DC converter is under overvoltage state, the main switching transistor Tr1 and the synchronous rectification transistor Tr2 are forcibly turned ON.

As a result, the voltage inputted to the DC/DC converter is applied via the fuse F1, the signal line 14, the main switching transistor Tr1, the signal line 1, the signal line 2, the synchrornous rectification transistor Tr2, and the signal line 26 to the ground. At this time, an overcurrent will flow through the fuse F1, so that this fuse F1 is melted down.

As a result, since the fuse F1 is melted down, it is possible to prevent the constructive elements of the fourth DC/DC converter, especially the capacitor C3 provided in the input unit of this DC/DC converter from being applied by the excessive high voltages. Therefore, it is possible to avoid that the capacitor C3 would be burned out.

According to the DC/DC converter of this fourth embodiment, the burn-out preventing fuse for the capacitor C3 is not required, resulting in the reduction of a total number of constructive elements.

In addition, since the burn-out preventing fuse for the capacitor C3 is not required, the resistance value of the fourth DC/DC converter would be lowered, so that the converting efficiency of the DC/DC converter could be increased.

(3) IN A CASE THAT SIGNAL LINE 4 IS DISCONNECTED

As previously described in th embodiment mode 2, when the signal line 4 is disconnected, there is a risk that the output voltage of the DC/DC converter is brought into the overvoltage state.

If the output voltage of the DC/DC converter is brought into the overvoltage state, since the output voltage becomes higher than the reference voltage e3, the voltage comparator IC2 outputs a high-level signal.

On the other hand; since the input voltage to the DC/DC converter is lower than, or equal to e1, the voltage comparator IC1 output a low-level signal.

The low-level signal outputted from the voltage comparator IC1 ts inputted to the set terminal S of the flip-flop FF1 of the control circuit CTL. Also, the high-level signal outputted from the voltage comparator IC2 is inputted to the set terminal S of the flip-flop FF2 of the control circuit CTL.

The flip-flop FF1 into which the low-level signal from the voltage comparator IC1 is inputted stores therein the inputted low-level signal. Then, the output terminal Q of the flip-flop FF1 outputs a low-level signal. The low-level signal outputted from the output terminal Q of the flip-flop FF1 is inputted to the OR gate circuit OR4 and the OR gate circuit OR1.

Also, the flip-flop FF2 into which the high-level signal from the voltage comparator IC2 is inputted stores therain the inputted high-level signal. Then, the output terminal Q of the flip-flop FF2 outputs a high-level signal, and the output terminal *Q thereof outputs a low-level signal. The high-level signal outputted from the output terminal Q of the flip-flop FF2 is inputted to the OR gate circuit OR5, and the low-level signal outputted from the output terminal *Q is inputted to the AND gate circuit AND1.

The AND sate circuit AND1 inputs thereinto the low-level signal from the output terminal *Q of the flip-flop FF2, and also inputs thereinto the signal from the PWM comparator 9. At this time, the AND gate circuit AND1 directly outputs a low-level signal, irrelevant to the signal derived from the PWM comparator 9. The low-level signal outputted from the AND gate circuit AND1 is inputted to the OR gate circuit OR4.

As described above, the OR gate circuit OR4 inputs thereinto the low-level signal outputted from the AND gate circuit AND1 and the the low-level signal from output terminal Q of the flip-flop FF2. In this case, the OR gate circuit OR4 outputs a low-level signal. As a consequence, the drive 1 (10) turns OFF the main switching transistor Tr1, irrelevant to tho output signal from the PWM comparator 9.

Also, the OR gate circuit OR1 inputs thereinto the low-level signal from the output terminal Q of the flip-flop FF1, and also inputs the signal from the synchronous rectification control circuit 13. In this case, the OR gate circuit OR1 directly outputs the signal derived from the synchronous rectification control circuit 13. The signal outputted from this OR gate circuit OR1 (equal to the signal from the synchronous rectification control circuit 13) is entered into the OR gate circuit OR5.

As explained before, the OR gate circuit OR5 inputs thereinto the high-level signal from the output terminal Q of the flip-flop FF2, and also the signal derived from the OR gate circuit OR1 (equal to the signal outputted from the synchronous rectification control circuit 13). At this time, the OR gate circuit OR5 outputs a high-level signal, irrelevant to the signal outputted from the OR gate OR1 (equal to the signal outputted from the synchronous rectification control circuit 13). As a result, the drive –2 (11) turns ON the synchronous rectification transistor Tr2, irrelevant to the signal from the synchronous control circuit 13.

As previously explained, when the output voltage of the DC/DC converter is brought into the overvoltage state, the main switching transistor Tr1 is forcibly turned OFF, and at the same time, the synchronous rectification transistor Tr2 is forcibly turned ON.

As a consequence, the signal line 26, the synchronous rectification transistor Tr2, the signal line 2, the signal line 1, the choke coil L1, the signal line 15, the resistor R1, and the signal line 16 are connected to each other, so that the output voltage of the second DC/DC converter is clamped to the ground potential (OV) connected to the signal line 26.

Accordingly, it is possible to prevent the overvoltage from being applied to the load of the second DC/DC converter. At the same time, it is possible to prevent the overvoltage from being applied to the constructive element of the DC/DC converter, especially, to the smoothing capacitor C1.

Accordingly to the DC/DC converter of this second embodiment, no longer the high withstanding voltage type organic capacitor is required as the smoothing capacitor C1. Moreover, the burn-out preventing fuse is not required, resulting in the reduction of a total number of constructive elements.

In addition, since the burn-out preventing fuse for the capacitor C1 is not required, the resistance value of the second DC/DC converter would be lowered, so that the converting efficiency of the DC/DC converter could be increased.

(4) IN A CASE THAT MAIN SWITCHING TRANSISTOR Tr1 IS SHORTCIRCUITED

When the main switching transistor Tr1 is shortcircuited, since the signal line 14 is connected to the signal line 1, there is a risk that the output voltage of the fourth DC/DC converter is brought into the overvoltage state.

When the output voltage becomes the overvoltage condition due to the shortcircuit failure of the main switching transistor Tr1, since the output voltage is increased higher than the reference voltage e3, the output comparator IC2 outputs a high-level signal.

On the other hand, since the input voltage of the DC/DC converter is lower than, or equal to the reference voltage e1, the OV1 outputted from the voltage comparator IC1 becomes a low-level signal.

As previously explained in the item (2), at this time, the control circuit CTL forcibly turns OFF the main switching transistor Tr1, and at the same time, forcibly turns ON the synchronous rectification transistor Tr2. It should be understood that since the main switching transistor Tr1 fails due to the shortcircuit, the voltage applied to the DC/DC converter is shortcircuited via this fuse F1, the signal line 14, the main switching transistor Tr1, the signal line 1, the signal line 2, and the synchronous rectification transistor Tr2. At this time, the fuse F1 is melt down by this shortcircuit current.

As a result, the voltage applied to the DC/DC converter is interrupted within a very short time period, so that it is possible to prevent the overvoltage from being applied to the load of this DC/DC converter at an earlier stage. At the same time, it is possible to prevent the overvoltage from being applied to the constructive element of the DC/DC converter.

According to the DC/DC converter of this fourth embodiment, no longer the high withstanding voltage type organic capacitor as the smoothing capacitor C1 is required as the capacitor C2. Moreover, the burn-out preventing fuse is not required, resulting in the reduction of a total number of constructive elements.

In addition, since the burn-out preventing fuse for the smoothing capacitor C1 is not required, the resistance value of the second DC/DC converter would be lowered, so that the converting efficiency of the DC/DC converter could be increased.

What is claimed is:

1. A synchronous rectification type DC/DC converter comprising:
    a storage unit storing therein power derived from a power supply;
    a first switch element connecting/disconnecting said storage unit to/from the power supply;
    a second switch element provided between said storage unit and the ground connecting/disconnecting said storage unit to/from the ground;
    a control unit controlling the connecting/disconnecting operations of said first switch element and said second switch element so as to maintain a voltage outputted from said storage unit to a predetermined value;
    an overvoltage detecting unit monitoring the voltage outputted from said storage unit and outputting a signal when said output voltage exceeds a predetermined voltage value; and
    a clamping unit bringing said first switch element to a disconnecting state and bringing said second switch element to a connecting state when said signal from said overvoltage detecting unit is inputted therein, whereby the output voltage from said storage unit is clamped to the ground level.

2. The DC/DC converter as claimed in claim 1 wherein: said overvoltage detecting unit comprises:
    a reference voltage producing unit producing a reference voltage, and
    a voltage comparator comparing said reference voltage with the voltage derived from said storage unit and outputting the signal when said voltage derived from said storage unit is higher than said reference voltage.

3. The DC/DC converter as claimed in claim 1, further comprising:
    a shortcircuiting unit bringing said second switch element to a connecting state when said first switch element fails under a shortcircuited state, whereby the voltage derived from said power supply is shortcircuited.

4. The DC/DC converter as claimed in claim 3 further comprising:
    an interrupting unit interrupting power of said power supply by the power short circuited by said short circuiting unit.

5. A DC/DC converter as claimed in claim 4, wherein: said interrupting unit is a fuse to be melted down by the power shortcircuited by said shortcircuiting unit.

6. The DC/DC converter as claimed in claim 1, further comprising:
    an interrupting unit, provided between said power and said first switch element, interrupting the power supply.

7. The DC/DC converter as claimed in claim 6, wherein said clamping unit makes said second switch element to a connecting state when said first switch element fails, whereby the voltage derived from said power supply is shortcircuited, and said interrupting unit interrupts the power supply by the power shortcircuited by said shortcircuiting unit.

8. A DC/DC converter, comprising:
    a storage unit storing therein power from a power supply;
    a first switch connecting/disconnecting said storage unit to/from the power supply;
    a second switch provided between said storage unit and the ground connecting/disconnecting said storage unit to/from the ground;
    a control unit controlling said first switch and said second switch so as to maintain a voltage outputted from said storage unit at a predetermined value;
    a detecting unit detecting that the voltage outputted from said storage unit exceeds a predetermined voltage value; and
    a clamping unit making said first switch disconnect and said second switch connect in accordance with said detecting unit.

9. The DC/DC converter as claimed in claim 8, wherein: said detecting unit comprises:
    a reference voltage producing unit producing a reference voltage, and
    a voltage comparator comparing said reference voltage produced by said reference voltage producing unit with the voltage derived from said storage unit and outputting a signal when said voltage derived from said storage unit is higher than said reference voltage.

10. The DC/DC converter as claimed in claim 8, further comprising:
    a shortcircuiting unit bringing said second switch to a connecting state when said first switch fails under a shortcircuited state, whereby the voltage from said power supply is shortcircuited.

11. The DC/DC converter as claimed in claim 10, further comprising:
    an interrupting unit interrupting the power supply.

12. The DC/DC converter as claimed in claim 11, wherein:
    said interrupting unit is a fuse.

13. The DC/DC converter as claimed in claim 8, further comprising:
    an interrupting unit, provided between said power and said first switch element, interrupting the power supply.

14. The DC/DC converter as claimed in claim 13, wherein said clamping unit makes said second switch to a connecting state when said first switch fails, whereby the voltage derived from said power supply is shortcircuited, and said interrupting unit interrupts the power supply by the power shortcircuited by said shortcircuited unit.

15. A synchronous rectification type DC/DC converter, comprising:
    a main switch;
    a synchronous rectification switch;
    an overvoltage detecting unit detecting an overvoltage of the synchronous rectification type DC/DC converter output; and
    a control unit outputting a first control signal to turn OFF the main switch and outputting a second control signal to turn ON the synchronous rectification switch in accordance with a detection of the overvoltage detecting unit so that the synchronous rectification type DC/DC converter output is forced to ground level.

16. The synchronous rectification type DC/DC converter as claimed in claim 15, further comprising:

an inductor connected to said main switch; and a capacitor connected to said inductor smoothing output of said inductor.

17. The synchronous rectification type DC/DC converter as claimed in claim 16, wherein said control unit turns the main switch OFF and the synchronous rectification switch ON in accordance with the detection of said overvoltage detecting unit, and thereby discharges said capacitor.

18. The synchronous rectification type DC/DC converter as claimed in claim 15, wherein said overvoltage detecting unit outputs a detecting signal when said overvoltage detects the overvoltage of the synchronous rectification type DC/DC converter output.

19. The synchronous rectification type DC/DC converter as claimed in claim 18, wherein the control unit has a memory circuit which stores the detecting signal and outputs said first control signal turning OFF the main switch and outputs said second control signal turning ON the synchronous rectification switch, when the detecting signal is inputted from the overvoltage detecting unit.

20. The synchronous rectification type DC/DC converter as claimed in claim 15, further comprising:

a feedback unit effecting feedback control of the synchronous rectification switch and the main switch in order to maintain an output voltage of the synchronous rectification type DC/DC converter at a constant value.

21. The synchronous rectification type DC/DC converter as claimed in claim 15, wherein said control unit outputs the second control signal when said main switch fails under a shortcircuited state, whereby an input power supply is shortcircuited.

22. The synchronous rectification type DC/DC converter as claimed in claims 15, further comprising:

an interrupting unit, provided between the main switch and power supply, interrupting an input of the power supply.

23. A synchronous rectification type DC/DC converter, comprising:

a main switch;

a synchronous rectification switch;

an overvoltage detecting unit detecting an overvoltage of the synchronous rectification type DC/DC converter output; and a control unit turning the main switch OFF and the synchronous rectification switch ON in accordance with a detection of the overvoltage detecting unit so that the synchronous rectification type DC/DC converter output is forced to ground level.

24. A control circuit for a synchronous rectification type DC/DC converter having a main switch and a synchronous rectification switch, thereby to effect a synchronous rectification type DC/DC conversion, comprising:

an overvoltage detecting unit detecting an overvoltage of the synchronous rectification type DC/DC converter output; and a control unit outputting a first control signal to turn OFF the main switch and outputting a second control signal to turn ON the synchronous rectification switch in accordance with a detection of the overvoltage detecting unit so that the synchronous rectification type DC/DC converter output is forced to ground level.

25. The control circuit for a synchronous rectification type DC/DC converter as claimed in claim 24, wherein said overvoltage detecting unit outputs a detecting signal when said overvoltage detecting unit detects the overvoltage of the synchronous rectification type DC/DC converter output.

26. The control circuit for a synchronous rectification type DC/DC converter as claimed in claim 25, wherein the control unit has a memory circuit which stores the detecting signal and outputs said first control signal turning OFF the main switch and outputs said second control signal turning ON the synchronous rectification switch, when the detecting signal is inputted from the overvoltage detecting unit.

27. The control circuit for a synchronous rectification type DC/DC converter as claimed in claim 24, further comprising:

a feedback unit effecting feedback control of the main switch and the synchronous rectification switch in order to maintain an output voltage of the synchronous rectification type DC/DC converter at a constant value.

28. The control circuit for a synchronous rectification type DC/DC converter as claimed in claim 24, wherein said control unit outputs the second control signal when said main switch fails, whereby power derived from said power supply is shortcircuited.

29. A control circuit for a synchronous rectification type DC/DC converter having a main switch, a synchronous rectification switch, an inductor connected to said main switch and a capacitor connected to said inductor smoothing output of said inductor, thereby to effect a synchronous rectification type DC/DC conversion, comprising:

an overvoltage detecting unit detecting an overvoltage of the synchronous rectification type DC/DC converter output; and a control unit outputting a first control signal to turn OFF the main switch and outputting a second control signal to turn ON the synchronous rectification switch in accordance with a detection of the overvoltage detecting unit so that the synchronous rectification type DC/DC converter output is forced to ground level.

30. The control circuit as claimed in 29, wherein said control unit outputs the first control signal to turn OFF the main switch and outputs the second control signal to turn ON the synchronous rectification switch in accordance with the detection of the overvoltage detecting unit, and thereby discharges the capacitor.

31. A control circuit for a synchronous type DC/DC converter having a main switch and a synchronous rectification switch, thereby to effect a synchronous rectification type DC/DC conversion, comprising:

an overvoltage detecting unit detecting an overvoltage of the synchronous rectification type DC/DC converter output; and a control unit turning the main switch OFF and the synchronous rectification switch ON in accordance with a detection of the overvoltage detecting unit so that the synchronous rectification type DC/DC converter output is forced to ground level.

32. A control circuit for a synchronous rectification type DC/DC converter having a main switch, a synchronous rectification switch, an inductor connected to said main switch and a capacitor connected to said inductor smoothing output of said inductor thereby to effect a synchronous rectification type DC/DC conversion, comprising:

an overvoltage detecting unit detecting an overvoltage of the synchronous rectification type DC/DC converter output; and a control unit turning the main switch OFF and the synchronous rectification switch ON in accordance with a detection of the overvoltage detecting unit so that the synchronous rectification type DC/DC converter output is forced to ground level.

33. The control circuit as claimed in claim 32, wherein said control unit turns the main switch OFF and the synchronous rectification switch ON in accordance with a detection of said overvoltage detecting unit, and thereby discharges the capacitor.

34. A control circuit for a synchronous rectification type DC/DC converter having a main switch and a synchronous rectification switch, thereby to effect a synchronous rectification type DC/DC conversion, comprising:

a receiving unit receiving a stop signal to stop a DC/DC conversion process; and a control unit outputting a first control signal to turn OFF the main switch and a second control signal to turn ON the synchronous rectification switch in response to the received stop signal.

35. The control circuit for a synchronous rectification type DC/DC converter as claimed in claim 34, wherein said stop signal informs that an output voltage of the synchronous rectification type DC/DC converter exceeds a preselected voltage value.

36. The control circuit for a synchronous rectification type DC/DC converter as claimed in claim 34, further comprising:

a feedback unit effecting feedback control of the main switch and the synchronous rectification switch in order to maintain an output voltage of the synchronous rectification type DC/DC converter at a constant value.

37. The control circuit for a synchronous rectification type DC/DC converter as claimed in claim 33, wherein said control unit outputs the second control signal when said main switch fails, whereby power derived from said power supply is short circuited.

38. A control circuit for a synchronous rectification type DC/DC converter having a main switch, a synchronous rectification switch, an inductor connected to said main switch and a capacitor connected to said inductor smoothing output of said inductor, thereby to effect a synchronous rectification type DC/DC conversion comprising:

a receiving unit receiving a stop signal to stop a DC/DC conversion process; and a control unit outputting a first control signal to turn OFF the main switch and a second control signal to turn ON the synchronous rectification switch in response to the received stop signal.

39. A control circuit for a synchronous rectification type DC/DC converter having a main switch and a synchronous rectification switch, thereby to effect a synchronous rectification type DC/DC conversion, comprising:

a receiving unit receiving a stop signal to stop a DC/DC conversion process; and a control unit making the main switch OFF and the synchronous rectification switch ON in response to the received stop signal.

40. A control circuit for a synchronous rectification type DC/DC converter having a main switch, a synchronous rectification switch, an inductor connected to said main switch and a capacitor connected to said inductor smoothing output of said inductor, thereby to effect a synchronous rectification type DC/DC conversion, comprising:

a receiving unit receiving a stop signal to stop a DC/DC conversion process; and a control unit making the main switch OFF and the synchronous rectification switch ON in response to the received stop signal.

41. A control circuit for controlling a synchronous rectification type DC/DC converter having a main switch and a synchronous rectification switch, comprising:

a voltage input terminal inputting therein an output voltage of a DC/DC conversion process;

an overvoltage detecting unit outputting a detecting signal when the output voltage [is] inputted into the voltage input terminal exceeds a predetermined value; and a clamping unit clamping the output of the DC/DC converter to the ground level by turning OFF the main switch and turning ON the synchronous rectification switch in response to the detecting signal.

42. A control circuit for controlling a synchronous rectification type DC/DC converter having a main switch and a synchronous rectification switch, comprising:

a receiving unit receiving a stop signal to stop a DC/DC conversion process; and a control unit cutting-off an output from the DC/DC converter by turning OFF the main switch and turning ON the synchronous rectification switch in response to the received stop signal.

43. A controller for a synchronous rectification type DC/DC converter having a storage unit storing therein power derived from a power supply, a first switch element connecting/disconnecting the storage unit to/from the power supply, a second switch element provided between the storage unit and ground connecting/disconnecting the storage unit to/from the ground, said controller comprising;

a first control unit controlling the connecting/disconnecting operations of the first switch element and the second switch element so as to maintain a voltage outputted from the storage unit at a predetermined value;

an overvoltage detecting unit monitoring the voltage outputted from the storage unit and detecting that the output voltage exceeds a predetermined voltage value; and a second control unit bringing the first switch element to a disconnecting state and bringing the second switch element to a connecting state in a case where said overvoltage detecting unit detects that the output voltage exceeds a predetermined voltage value, so that the output voltage from the storage unit is forced to a ground level.

44. The controller as claimed in claim 43 wherein said overvoltage detecting unit comprises:

a reference voltage producing unit producing a reference voltage; and a voltage comparator comparing said reference voltage with the voltage derived from the storage unit and outputting the signal when the voltage derived from the storage unit is higher that the reference voltage.

45. A controller for a DC/DC converter having a storage unit storing therein power from a power supply, a first switch connecting/disconnecting the storage unit to/from the power supply, a second switch provided between the storage unit and ground connecting/disconnecting the storage unit to/from the ground, said controller comprising:

a first control unit controlling the first switch and the second switch so as to maintain a voltage outputted from the storage unit at a predetermined value;

a detecting unit detecting that the voltage outputted from the storage unit exceeds the predetermined voltage value; and a second control unit making the first switch disconnect and the second switch connect in accordance with said detecting unit.

46. The DC/DC converter as claimed in claim 45, wherein said detecting unit comprises:

a reference voltage producing unit producing the predetermined voltage value; and a voltage comparator comparing the predetermined voltage value produced by said reference voltage producing unit with the voltage derived from the storage unit and outputting a signal when the voltage derived from the storage unit is higher than the predetermined voltage value.

* * * * *

UNITED STATES PATENT AND TRADEMARK OFFICE
CERTIFICATE OF CORRECTION

PATENT NO. : 6,028,755
DATED : February 22, 2000
INVENTOR(S) : Mitsuo Saeki et al It is certified that error appears in the above-identified patent and that said Letters Patent is hereby corrected as shown below:

On the title page: Item [54] and Column 1, line 2, change "OVERVOLTAGES" to --OVERVOLTAGE--.

Col. 43, Claim 37, line 2, change "33" to --34--.

Col. 44, Claim 41, line 7, delete "[is]".

Signed and Sealed this

Thirtieth Day of January, 2001

Attest:

Q. TODD DICKINSON

*Attesting Officer*      *Director of Patents and Trademarks*